US012591112B2

(12) United States Patent
Teranishi

(10) Patent No.: US 12,591,112 B2
(45) Date of Patent: Mar. 31, 2026

(54) OPTICAL IMAGING SYSTEM

(71) Applicant: AAC OPTICS (CHANGZHOU) CO., LTD., Changzhou City (CN)

(72) Inventor: Takaaki Teranishi, Osaka (JP)

(73) Assignee: AAC OPTICS (CHANGZHOU) CO., LTD., Changzhou City (CN)

( * ) Notice: Subject to any disclaimer, the term of this patent is extended or adjusted under 35 U.S.C. 154(b) by 331 days.

(21) Appl. No.: 18/404,802

(22) Filed: Jan. 4, 2024

(65) Prior Publication Data

US 2024/0345365 A1 Oct. 17, 2024

(30) Foreign Application Priority Data

Apr. 11, 2023 (CN) .......................... 202310380390.9

(51) Int. Cl.
*G02B 9/64* (2006.01)

(52) U.S. Cl.
CPC ...................................... *G02B 9/64* (2013.01)

(58) Field of Classification Search
CPC ...... G02B 9/64; G02B 13/00; G02B 13/0045; G02B 13/0015; G02B 1/00; G02B 27/0031
See application file for complete search history.

(56) References Cited

U.S. PATENT DOCUMENTS 7,068,429 B1 * 6/2006 Ori ................. G02B 15/144113
359/740
11,947,091 B2 * 4/2024 Liu ................ G02B 15/145125

* cited by examiner

*Primary Examiner* — Tuyen Tra
(74) *Attorney, Agent, or Firm* — Wiersch Law Group

(57) ABSTRACT

The present disclosure discloses an optical imaging system satisfying: $0.38 \leq f10\text{-}12/f \leq 0.90$, $-21.70 \leq f7\text{-}8/(d13+d15) \leq -1.00$, $2.00 \leq d17/d18 \leq 10.00$, and $1.00 \leq (d1+d3)/d23' \leq 5.00$, where f denotes a focal length of the optical imaging system; f10-12 denotes a combined focal length of the tenth lens, the eleventh lens and the twelfth lens; f7-8 denotes a combined focal length of the seventh lens and the eighth lens; d1 and d3 denotes an on-axis thickness of the first and second lens; d23' denotes an on-axis distance from the second lens to the third lens; d13, d15 and d17 denotes an on-axis thickness of the seventh, eighth, and ninth lens; and d18 denotes an on-axis distance from the ninth lens to the tenth lens. The optical imaging system of the present disclosure has good optical performance, variable aperture and low distortion, and can change the depth of field during measurement.

16 Claims, 8 Drawing Sheets

10

10

Longitudinal aberration mm

Lateral color

Field curvature                    Distortion

Longitudinal aberration

1

OPTICAL IMAGING SYSTEM

TECHNICAL FIELD

The present disclosure relates to the field of optical lenses, and particularly to an optical imaging system suitable for industrial line scanning lenses.

BACKGROUND

With the rapid development of industrial automation, machine vision has been widely used in industrial automation production, assembly line inspection, logistics sorting, medicine, scientific research and other fields, for detection, discrimination and measurement of target parts, to reduce or eliminate the misjudgment caused by manual operation, and significantly improve measurement accuracy and efficiency. Optical imaging systems such as industrial line scanning lenses play an important role as the "eyes" of machine vision. In the application scenarios such as defect detection of LCD (liquid crystal display) screens and circuit lines of mobile phone touch screens in the manufacturing of electronic products, the requirements for industrial line scanning lenses are becoming higher and higher.

At present, in order to obtain better imaging quality, the optical imaging system for industrial line scanning lenses mostly adopts a multi-piece lens structure. Moreover, with the development of technology and the increasing demand of users for diversified needs, in the case where the pixel area of the photosensitive device continues to shrink and the requirements for imaging quality of the system continue to increase, the twelve-piece lens structure gradually appears in the design of industrial line scanning lenses, but there are still insufficient optical performance, large volume, and inability to change the depth of field during measurement, and other defects. There is an urgent need for a telephoto camera lens with excellent optical characteristics, small volume, fully corrected aberrations, and variable aperture.

SUMMARY

To solve the above problems, the purpose of the present disclosure is to provide an optical imaging system that has excellent optical characteristics, low distortion, and can change the depth of field during measurement, meeting the design requirements of industrial line scanning.

To solve the above technical problems, an embodiment of the present disclosure provides an optical imaging system, which includes from an object side to an image side: a first lens having a negative refractive power; a second lens having a positive refractive power; a third lens having a negative refractive power; a fourth lens having a positive refractive power; a fifth lens having a positive refractive power; a sixth lens having a negative refractive power; a seventh lens having a positive refractive power; an eighth lens having a negative refractive power; a ninth lens having a negative refractive power; a tenth lens having a positive refractive power; an eleventh lens having a negative refractive power; and a twelfth lens having a positive refractive power; wherein the optical imaging system satisfies following conditions:

$$0.38 \le f10\text{-}12/f \le 0.90;$$

$$-21.70 \le f7\text{-}8/(d13+d15) \le -1.00;$$

2

-continued $$2.00 \le d17/d18 \le 10.00; \text{ and}$$

$$1.00 \le (d1+d3)/d23' \le 5.00;$$

where
f denotes a focal length of the optical imaging system; f10-12 denotes a combined focal length of the tenth lens, the eleventh lens and the twelfth lens; f7-8 denotes a combined focal length of the seventh lens and the eighth lens; d1 denotes an on-axis thickness of the first lens; d3 denotes an on-axis thickness of the second lens; d23' denotes an on-axis distance from the image-side surface of the second lens to the object-side surface of the third lens; d13 denotes an on-axis thickness of the seventh lens; d15 denotes an on-axis thickness of the eighth lens; d17 denotes an on-axis thickness of the ninth lens; and d18 denotes an on-axis distance from the image-side surface of the ninth lens to the object-side surface of the tenth lens.

As an improvement, the optical imaging system further satisfies following conditions:

$$43.00 \le v5 - v6 \le 77.60;$$

where
v5 denotes an abbe number of the fifth lens; and
v6 denotes an abbe number of the sixth lens.

As an improvement, the optical imaging system further includes a Beam splitter, the optical imaging system further satisfies following conditions:

$$0.12 \le d0/L \le 0.26;$$

where
d0 denotes an on-axis distance from an object surface of the optical imaging system to the object-side surface of the Beam splitter; and
L denotes an on-axis distance from the object surface of the optical imaging system to the image-side surface of the twelfth lens.

As an improvement, an object-side surface of the first lens is concave in a paraxial region; and
the optical imaging system further satisfies following conditions:

$$-1.26 \le f1/f \le -0.14;$$

$$-8.54 \le (R3+R4)/(R3-R4) \le 0.39;$$

$$0.00 \le d1/TTL \le 0.02;$$

where
f1 denotes a focal length of the first lens;
TTL denotes a total optical length of the optical imaging system;
R3 denotes a curvature radius of the object-side surface of the first lens; and
R4 denotes a curvature radius of a bonding surface of the first lens and the second lens.

As an improvement, an image-side surface of the second lens is convex in a paraxial region; and the optical imaging system further satisfies following conditions:

$$0.12 \le f2/f \le 1.11;$$

$$-0.61 \le (R4 + R5)/(R4 - R5) \le 9.86;$$

$$0.00 \le d3/TTL \le 0.05;$$

where f2 denotes a focal length of the second lens;

TTL denotes a total optical length of the optical imaging system;

R4 denotes a curvature radius of a bonding surface of the first lens and the second lens; and R5 denotes a curvature radius of the image-side surface of the second lens.

As an improvement, an object-side surface of the third lens is convex in a paraxial region, an image-side surface of the third lens is concave in a paraxial region; and the optical imaging system further satisfies following conditions:

$$-2.16 \le f3/f \le -0.50;$$

$$0.58 \le (R6 + R7)/(R6 - R7) \le 2.91;$$

$$0.00 \le d5/TTL \le 0.01;$$

where f3 denotes a focal length of the third lens;

d5 denotes an on-axis thickness of the third lens;

TTL denotes a total optical length of the optical imaging system;

R6 denotes a curvature radius of the object-side surface of the third lens; and

R7 denotes a curvature radius of a bonding surface of the third lens and the fourth lens.

As an improvement, an object-side surface of the fourth lens is convex in a paraxial region, an image-side surface of the fourth lens is convex in a paraxial region; and the optical imaging system further satisfies following conditions:

$$0.23 \le f4/f \le 1.00;$$

$$-0.74 \le (R7 + R8)/(R7 - R8) \le -0.14;$$

$$0.01 \le d7/TTL \le 0.05;$$

where f4 denotes a focal length of the fourth lens;

d7 denotes an on-axis thickness of the fourth lens;

TTL denotes a total optical length of the optical imaging system;

R7 denotes a curvature radius of a bonding surface of the third lens and the fourth lens; and R8 denotes a curvature radius of the image-side surface of the fourth lens.

As an improvement, an object-side surface of the fifth lens is convex in a paraxial region, an image-side surface of the fifth lens is convex in a paraxial region; and the optical imaging system further satisfies following conditions:

$$0.27 \le f5/f \le 1.11;$$

$$-0.63 \le (R9 + R10)/(R9 - R10) \le 0.30;$$

$$0.01 \le d9/TTL \le 0.04;$$

where f5 denotes a focal length of the fifth lens;

d9 denotes an on-axis thickness of the fifth lens;

TTL denotes a total optical length of the optical imaging system;

R9 denotes a curvature radius of the object-side surface of the fifth lens; and

R10 denotes a curvature radius of a bonding surface of the fifth lens and the sixth lens.

As an improvement, an object-side surface of the sixth lens is concave in a paraxial region, an image-side surface of the sixth lens is convex in a paraxial region; and the optical imaging system further satisfies following conditions:

$$-3.09 \le f6/f \le -0.69;$$

$$-8.03 \le (R10 + R11)/(R10 - R11) \le -0.71;$$

$$0.00 \le d11/TTL \le 0.02;$$

where f6 denotes a focal length of the sixth lens;

d11 denotes an on-axis thickness of the sixth lens;

TTL denotes a total optical length of the optical imaging system;

R10 denotes a curvature radius of a bonding surface of the fifth lens and the sixth lens; and R11 denotes a curvature radius of the image-side surface of the sixth lens.

As an improvement, an object-side surface of the seventh lens is convex in a paraxial region; and the optical imaging system further satisfies following conditions:

$$0.23 \le f7/f \le 2.23;$$

$$-11.17 \le (R12 + R13)/(R12 - R13) \le 0.54;$$

$$0.00 \le d13/TTL \le 0.12;$$

where f7 denotes a focal length of the seventh lens;

TTL denotes a total optical length of the optical imaging system;

R12 denotes a curvature radius of the object-side surface of the seventh lens; and R13 denotes a curvature radius of a bonding surface of the seventh lens and the eighth lens.

As an improvement, an image-side surface of the eighth lens is concave in a paraxial region; and the optical imaging system further satisfies following conditions:

5

$$-1.15 \le f8/f \le -0.13;$$

$$0.28 \le (R13 + R14)/(R13 - R14) \le 3.15;$$

$$0.00 \le d15/TTL \le 0.07;$$

where
f8 denotes a focal length of the eighth lens;
TTL denotes a total optical length of the optical imaging system;
R13 denotes a curvature radius of a bonding surface of the seventh lens and the eighth lens; and
R14 denotes a curvature radius of the image-side surface of the eighth lens.

As an improvement, the optical imaging system further satisfies following conditions:

$$-2.40 \le f9/f \le -0.31;$$

$$-2.84 \le (R15 + R16)/(R15 - R16) \le 1.63;$$

$$0.00 \le d17/TTL \le 0.05;$$

where
f9 denotes a focal length of the ninth lens;
TTL denotes a total optical length of the optical imaging system;
R15 denotes a curvature radius of an object-side surface of the ninth lens; and
R16 denotes a curvature radius of the image-side surface of the ninth lens.

As an improvement, an image-side surface of the tenth lens is convex in a paraxial region; and
the optical imaging system further satisfies following conditions:

$$0.19 \le f10/f \le 1.11;$$

$$0.20 \le (R17 + R18)/(R17 - R18) \le 2.56;$$

$$0.01 \le d19/TTL \le 0.04;$$

where
f10 denotes a focal length of the tenth lens;
d19 denotes an on-axis thickness of the tenth lens;
TTL denotes a total optical length of the optical imaging system;
R17 denotes a curvature radius of the object-side surface of the tenth lens; and
R18 denotes a curvature radius of the image-side surface of the tenth lens.

As an improvement, an object-side surface of the eleventh lens is concave in a paraxial region, an image-side surface of the eleventh lens is convex in a paraxial region; and
the optical imaging system further satisfies following conditions:

$$-2.67 \le f11/f \le -0.37;$$

$$-8.92 \le (R19 + R20)/(R19 - R20) \le -0.76;$$

$$0.00 \le d21/TTL \le 0.01;$$

6 where
f11 denotes a focal length of the eleventh lens;
d21 denotes an on-axis thickness of the eleventh lens;
TTL denotes a total optical length of the optical imaging system;
R19 denotes a curvature radius of the object-side surface of the eleventh lens; and
R20 denotes a curvature radius of the image-side surface of the eleventh lens.

As an improvement, an image-side surface of the twelfth lens is convex in a paraxial region; and
the optical imaging system further satisfies following conditions:

$$0.26 \le f12/f \le 2.71;$$

$$0.31 \le (R21 + R22)/(R21 - R22) \le 3.92;$$

$$0.01 \le d23/TTL \le 0.03;$$

where
f12 denotes a focal length of the twelfth lens;
d23 denotes an on-axis thickness of the twelfth lens;
TTL denotes a total optical length of the optical imaging system;
R21 denotes a curvature radius of the object-side surface of the twelfth lens; and
R22 denotes a curvature radius of the image-side surface of the twelfth lens.

As an improvement, the first lens, the second lens, the third lens, the fourth lens, the fifth lens, the sixth lens, the seventh lens, the eighth lens, the ninth lens, the tenth lens, the eleventh lens and the twelfth lens are all made of glass.

The beneficial effect of the present disclosure is that the optical imaging system of the present disclosure has good optical performance, is designed for low distortion imaging, strictly controls image distortion, presents the true imaging of the detected object to the maximum extent, and can flexibly adjust the depth of field during measurement, especially suitable for industrial inspection line scanning lenses used for high-pixel applications.

BRIEF DESCRIPTION OF DRAWINGS

In order to more clearly describe the technical solutions in the embodiments of the present disclosure, the following briefly describes the drawings used in the description of the embodiments. Obviously, the following drawings are only some embodiments of the present disclosure, and those skilled in the art can obtain other drawings without creative efforts, among which.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers understand the present disclosure better. However, even without these technical details and any changes and modifications based on the following embodiments, technical solutions required to be protected by the present disclosure can be implemented.

Embodiment 1

Figure 1:
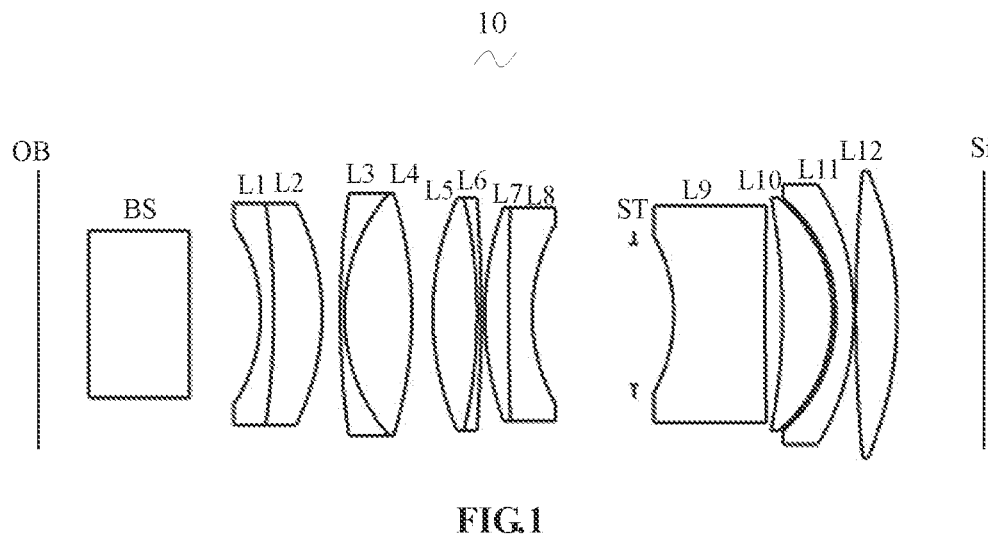
FIG. 1 is a schematic diagram of a structure of an optical imaging system 10 according to Embodiment 1 of the present disclosure.

Referring to the accompanying drawings, the present disclosure provides an optical imaging system 10. FIG. 1 shows the optical imaging system 10 of Embodiment 1 of the present disclosure, the optical imaging system 10 includes, from an object side to an image side: an object surface OBJ, a Beam splitter BS, a first lens L1 having a negative refractive power, a second lens L2 having a positive refractive power, a third lens L3 having a negative refractive power, a fourth lens L4 having a positive refractive power, a fifth lens L5 having a positive refractive power, a sixth lens L6 having a negative refractive power, a seventh lens L7 having a positive refractive power, an eighth lens L8 having a negative refractive power, a ninth lens L9 having a negative refractive power, a tenth lens L10 having a positive refractive power, an eleventh lens L11 having a negative refractive power, a twelfth lens L12 having a positive refractive power, and an image surface Si.

In this embodiment, the first lens L1, the second lens L2, the third lens L3, the fourth lens L4, the fifth lens L5, the sixth lens L6, the seventh lens L7, the eighth lens L8, the ninth lens L9, the tenth lens L10, the eleventh lens L11 and the twelfth lens L12 are all made of glass.

Here, a focal length of the optical imaging system is defined as f, a combined focal length of the tenth lens L10, the eleventh lens L11 and the twelfth lens L12 is defined as f10-12, and the optical imaging system should satisfy a condition of $0.38 \le$ f10-12/$f \le 0.90$, which fixes a range of the ratio of the image-side lens module and the focal length of the optical imaging system, ensuring that the light at the image-side has sufficient convergence ability.

A combined focal length of the seventh lens L7 and the eighth lens L8 is defined as f7-8, an on-axis thickness of the seventh lens L7 is defined as d13, an on-axis thickness of the eighth lens L8 is defined as d15, and the optical imaging system should satisfy a condition of $-21.70 \le$ f7-8/(d13+d15) $\le -1.00$, which fixes a range of the ratio of the focal length and the thickness of the combined lens, thereby ensuring sufficient refractive power while maintaining a reasonable thickness, which is beneficial for correcting distortion, and ensuring the absolute value of distortion less than or equal to 0.95%.

An on-axis thickness of the ninth lens L9 is defined as d17, an on-axis distance from the ninth lens L9 to the tenth lens L10 is defined as d18, and the optical imaging system should satisfy a condition of $2.00 \le$ d17/d18 $\le 10.00$. d17 is the central thickness of the ninth lens L9, d18 is an on-axis distance from the ninth lens L9 to the rear lens, and the range limited by aforementioned condition can avoid assembly interference caused by the small distance between the lenses, thereby improving the assembly yield. It can also balance the lens thickness of the ninth lens L9 to avoid uneven molding caused by excessive lens thickness, and effectively reduce sensitivity.

An on-axis thickness of the first lens L1 is defined as d1, an on-axis thickness of the second lens L2 is defined as d3, an on-axis distance from the image-side surface of the second lens L2 to the object-side surface of the third lens L3 is defined as d23', and the optical imaging system should satisfy a condition of $1.00 \le$ (d1+d3)/d23'$\le 5.00$. d1+d3 are the central thickness of the cemented lens formed by the combination of the first lens L1 and the second lens L2. d23' is an on-axis distance from the second lens L2 to the third lens L3.

In this embodiment, an abbe number of the fifth lens L5 is defined as v5, an abbe number of the sixth lens L6 is defined as v6, and the optical imaging system should satisfy a condition of $-43.00 \le$ v5-v6 $\le 77.60$. The range limited by aforementioned condition can effectively correct the chromatic aberration of the system, and ensuring the absolute value of lateral chromatic less than or equal to 4 u m.

In this embodiment, the optical imaging system 10 further includes a Beam splitter BS, an on-axis distance from an object surface OBJ to the object-side surface of the Beam splitter BS is defined as L, and the optical imaging system should satisfy a condition of $0.12 \le$ d0/L$\le 0.26$. It should be noted that, do is the distance from the object (the object side focal plane of the optical system) to the object side surface of the beam splitter BS closest to the object, and L is the on-axis distance from the object to the lens surface closest to the image side. If the lower limit value of the conditional formula is exceeded, the distance between the lens system and the object is too narrow, resulting in poor operability of the device using the line-scan lens. Conversely, if the upper limit value of the conditional formula is exceeded, the space available for the lens portion is insufficient. Therefore, the number and thickness of the lenses that can be configured are limited, making it difficult to correct spherical aberration and chromatic aberration.

In this embodiment, a focal length of the optical imaging system 10 is defined as f, a focal length of the first lens L1 is defined as f1, and the optical imaging system should satisfy a condition of $-1.26 \le$ f1/$f \le -0.14$, which fixes the negative refractive power of the first lens L1. When the upper limit specified value is exceeded, although it is beneficial for the lens to develop towards miniaturization, the negative refractive power of the first lens L1 will be too strong, making it difficult to correct aberrations and other issues. Conversely, when the lower limit specified value is exceeded, the negative refractive power of the first lens L1 will become too weak, making it difficult to control the lens thickness. Preferably, the condition of $-0.79 \leq f1/f \leq -0.18$ should be met.

An on-axis thickness of the first lens L1 is defined as d1, a total optical length of the optical imaging system 10 is defined as TTL, and the optical imaging system should satisfy a condition of $0.00 \leq d1/TTL \leq 0.02$. Within the range of the conditional formula, it is beneficial for controlling the thickness of the lens and the total length of the lens. Preferably, the condition of $0.00 \leq d1/TTL \leq 0.01$ should be met.

A curvature radius of the object-side surface of the first lens L1 is defined as R3, a curvature radius of a bonding surface of the first lens L1 and the second lens L2 is defined as R4, and the optical imaging system should satisfy a condition of $-8.54 \leq (R3+R4)/(R3-R4) \leq 0.39$. By reasonably controlling the shape of the first lens L1, the first lens L1 can effectively correct the system spherical aberration. Preferably, the condition of $-5.34 \leq (R3+R4)/(R3-R4) \leq 0.31$ should be met.

In this embodiment, an object-side surface of the first lens L1 is concave in a paraxial region, an image-side surface of the first lens L1 is convex in a paraxial region, and the first lens L1 has a negative refractive power. In other optional implementations, the object-side surface and image-side surface of the first lens L1 can also be set to other concave-convex distributions.

In this embodiment, a focal length of the optical imaging system 10 is defined as f, a focal length of the second lens L2 is defined as f2, and the optical imaging system should satisfy a condition of $0.12 \leq f2/f \leq 1.11$, which fixes the positive refractive power of the second lens L2. By reasonably distributing the diopter, the system can achieve better imaging quality and lower sensitivity. Preferably, the condition of $0.19 \leq f2/f \leq 0.89$ should be met.

An on-axis thickness of the second lens L2 is defined as d3, a total optical length of the optical imaging system 10 is defined as TTL, and the optical imaging system should satisfy a condition of $0.00 \leq d3/TTL \leq 0.05$. Within the range of the conditional formula, it is beneficial for controlling the thickness of the lens and the total length of the lens. Preferably, the condition of $0.01 \leq d3/TTL \leq 0.04$ should be met.

A curvature radius of a bonding surface of the first lens L1 and the second lens L2 is defined as R4, a curvature radius of the image-side surface of the second lens L2 is defined as R5, and the optical imaging system should satisfy a condition of $-0.61 \leq (R4+R5)/(R4-R5) \leq 9.86$, which specified the shape of the second lens L2. Within the range specified by the conditional formula, it can reduce the degree of refraction of the light passing through the lens, effectively reducing aberrations. Preferably, the condition of $-0.38 \leq (R4+R5)/(R4-R5) \leq 7.89$ should be met.

In this embodiment, an object-side surface of the second lens L2 is concave in a paraxial region, an image-side surface of the second lens is convex in a paraxial region, and the second lens L2 has a positive refractive power. In other optional implementations, the object-side surface and image-side surface of the second lens L2 can also be set to other concave-convex distributions.

In this embodiment, a focal length of the optical imaging system 10 is defined as f, a focal length of the third lens L3 is defined as f3, and the optical imaging system should satisfy a condition of $-2.16 \leq f3/f \leq -0.50$, which fixes the negative refractive power of the third lens L3. By reasonably distributing the diopter, the system can achieve better imaging quality and lower sensitivity. Preferably, the condition of $-1.35 \leq f3/f \leq -0.62$ should be met.

An on-axis thickness of the third lens L3 is defined as d5, a total optical length of the optical imaging system 10 is defined as TTL, and the optical imaging system should satisfy a condition of $0.00 \leq d5/TTL \leq 0.01$. Within the range of the conditional formula, it is beneficial for controlling the thickness of the lens and the total length of the lens.

A curvature radius of the object-side surface of the third lens L3 is defined as R6, a curvature radius of a bonding surface of the third lens L3 and the fourth lens L4 is defined as R7, and the optical imaging system should satisfy a condition of $0.58 \leq (R6+R7)/(R6-R7) \leq 2.91$, which specifies a shape of the third lens L3. Within this range, it is beneficial for correcting the aberration of the off-axis angle of view as the miniaturization develops. Preferably, $0.93 \leq (R6+R7)/(R6-R7) \leq 2.33$ is satisfied.

In this embodiment, an object-side surface of the third lens L3 is convex in a paraxial region, an image-side surface of the third lens L3 is concave in a paraxial region, and the third lens L3 has a negative refractive power.

In this embodiment, a focal length of the optical imaging system 10 is defined as f, a focal length of the fourth lens L4 is defined as f4, and the optical imaging system should satisfy a condition of $0.23 \leq f4/f \leq 1.00$, which specifies the positive refractive power of the fourth lens L4. By reasonably distributing the diopter, the optical imaging system has better imaging quality and lower sensitivity. Preferably, $0.37 \leq f4/f \leq 0.80$ is satisfied.

An on-axis thickness of the fourth lens L4 is defined as d7, a total optical length of the optical imaging system 10 is defined as TTL, and the optical imaging system should satisfy a condition of $0.01 \leq d7/TTL \leq 0.05$. Within the range of the conditional formula, it is beneficial to control the lens thickness and the total length of the lens. Preferably, $0.01 \leq d7/TTL \leq 0.04$ is satisfied.

A curvature radius of a bonding surface of the third lens L3 and the fourth lens L4 is defined as R7, a curvature radius of the image-side surface of the fourth lens L4 is defined as R8, and the optical imaging system should satisfy a condition of $-0.74 \leq (R7+R8)/(R7-R8) \leq -\textbf{0.14}$, which specifies a shape of the fourth lens L4. Within the range of the range, it is beneficial to correct the chromatic aberration in the axial direction, as the lens develops towards miniaturization. Preferably, $-0.46 \leq (R7+R8)/(R7-R8) \leq 0.17$ is satisfied.

In this embodiment, an object-side surface of the fourth lens L4 is convex in a paraxial region, an image-side surface of the fourth lens L4 is convex in a paraxial region, and the fourth lens L4 has a positive refractive power.

In this embodiment, a focal length of the optical imaging system 10 is defined as f, a focal length of the fifth lens L5 is defined as f5, and the optical imaging system should satisfy a condition of $0.27 \leq f5/f \leq 1.11$, which specifies the positive refractive power of the fifth lens L5. When the lower limit specified value is exceeded, although it is beneficial for the lens to develop towards miniaturization, the positive refractive power of the fifth lens L5 will be too strong, making it difficult to correct aberrations. Conversely, when the upper limit specified value is exceeded, the positive refractive power of the fifth lens L5 will become too weak, making it difficult to control the lens thickness. Preferably, $0.43 \leq f5/f \leq 0.89$ is satisfied.

An on-axis thickness of the fifth lens L5 is defined as d9, a total optical length of the optical imaging system 10 is defined as TTL, and the optical imaging system should satisfy a condition of $0.01 \leq d9/TTL \leq 0.04$. Within the range of the conditional formula, it is beneficial to control the lens thickness and the total length of the lens. Preferably, $0.01 \leq d9/TTL \leq 0.03$ is satisfied.

A curvature radius of the object-side surface of the fifth lens L5 is defined as R9, a curvature radius of a bonding surface of the fifth lens L5 and the sixth lens L6 is defined as R10, and the optical imaging system should satisfy a condition of $-0.63 \leq (R9+R10)/(R9-R10) \leq 0.30$, which specifies a shape of the fifth lens L5. Within the range, as the lens develops towards miniaturization, it is beneficial to correct the chromatic aberration in the axial direction. Preferably, $-0.39 \leq (R9+R10)/(R9-R10) \leq 0.24$ is satisfied.

In this embodiment, an object-side surface of the fifth lens L5 is convex in a paraxial region, an image-side surface of the fifth lens L5 is convex in a paraxial region, and the fifth lens L5 has a positive refractive power.

In this embodiment, a focal length of the optical imaging system 10 is defined as f, a focal length of the sixth lens L6 is defined as f6, and the optical imaging system should satisfy a condition of $-3.09 \leq f6/f \leq -0.69$, which specifies the negative refractive power of the sixth lens L6. By reasonably distributing the diopter, the system has better imaging quality and lower sensitivity. Preferably, $-1.93 \leq f5/f \leq -0.87$ is satisfied.

An on-axis thickness of the sixth lens L6 is defined as d11, a total optical length of the optical imaging system 10 is defined as TTL, and the optical imaging system should satisfy a condition of $0.00 \leq d11/TTL \leq 0.02$. Within the range of the conditional formula, it is beneficial to control the lens thickness and the total length of the lens.

A curvature radius of a bonding surface of the fifth lens L5 and the sixth lens L6 is defined as R10, a curvature radius of the image-side surface of the sixth lens L6 is defined as R11, and the optical imaging system should satisfy a condition of $-8.03 \leq (R10+R11)/(R10-R11) \leq -0.71$, which specifies a shape of the sixth lens L6. Within the range, the shape of the sixth lens L6 can be effectively controlled, which is beneficial to the processing of the sixth lens L6 and avoids the difficulty in processing due to the excessive surface curvature of the sixth lens L6. Preferably, $-5.02 \leq (R10+R11)/(R10-R11) \leq -0.89$ is satisfied.

In this embodiment, an object-side surface of the sixth lens L6 is concave in a paraxial region, an image-side surface of the sixth lens L6 is convex in a paraxial region, and the sixth lens has a negative refractive power.

In this embodiment, a focal length of the optical imaging system 10 is defined as f, a focal length of the seventh lens L7 is defined as f7, and the optical imaging system should satisfy a condition of $0.23 \leq f7/f \leq 2.23$, which specifies the positive refractive power of the seventh lens L7. By reasonably distributing the diopter, the system has better imaging quality and lower sensitivity. Preferably, $0.37 \leq f7/f \leq 1.78$ is satisfied.

An on-axis thickness of the seventh lens L7 is defined as d13, a total optical length of the optical imaging system 10 is defined as TTL, and the optical imaging system should satisfy a condition of $0.00 \leq d13/TTL \leq 0.12$. Within the range of the conditional formula, it is beneficial to control the lens thickness and the total length of the lens. $0.01 \leq d13/TTL \leq 0.10$ is satisfied.

A curvature radius of the object-side surface of the seventh lens L7 is defined as R12, a curvature radius of a bonding surface of the seventh lens L7 and the eighth lens L8 is defined as R13, and the optical imaging system should satisfy a condition of $-11.17 \leq (R12+R13)/(R12-R13) \leq 0.54$, which specifies a shape of the seventh lens L7. Within the range, as the lens develops towards miniaturization, it is beneficial to correct the chromatic aberration in the axial direction. Preferably, $-6.98 \leq (R12+R13)/(R12-R13) \leq 0.44$ is satisfied.

In this embodiment, an object-side surface of the seventh lens L7 is convex in a paraxial region, an image-side surface of the seventh lens L7 is concave in a paraxial region, and the seventh lens L7 has a positive refractive power. In other optional implementation, the image-side surface of the seventh lens L7 can also be set to other concave-convex distributions.

In this embodiment, a focal length of the optical imaging system 10 is defined as f, a focal length of the eighth lens L8 is defined as f8, and the optical imaging system should satisfy a condition of $-1.15 \leq f8/f \leq -0.13$, which specifies the negative refractive power of the eighth lens L8. By reasonably distributing the diopter, the system has better imaging quality and lower sensitivity. Preferably, $-0.72 \leq f7/f \leq -0.16$ is satisfied.

An on-axis thickness of the eighth lens L8 is defined as d15, a total optical length of the optical imaging system 10 is defined as TTL, and the optical imaging system should satisfy a condition of $0.00 \leq d15/TTL \leq 0.07$. Within the conditional range, it is beneficial for controlling the thickness of the lens and the total length of the lens. Preferably, $0.00 \leq d15/TTL \leq 0.06$ is satisfied.

A curvature radius of a bonding surface of the seventh lens L7 and the eighth lens L8 is defined as R13, a curvature radius of the image-side surface of the eighth lens L8 is defined as R14, and the optical imaging system should satisfy a condition of $0.28 \leq (R13+R14)/(R13-R14) \leq 3.15$, which specifies a shape of the seventh lens L7. Within the range, with the development of lens miniaturization, it is beneficial to correct the problem of axial chromatic aberration. Preferably, $0.44 \leq (R13+R14)/(R13-R14) \leq 2.52$ is satisfied.

In this embodiment, an object-side surface of the eighth lens L8 is convex in a paraxial region, an image-side surface of the eighth lens L8 is concave in a paraxial region, and the eighth lens L8 has a negative refractive power. In other optional embodiments, the object-side surface and image-side surface of the eighth lens L8 can also be set to other concave-convex distributions.

In this embodiment, a focal length of the optical imaging system 10 is defined as f, a focal length of the ninth lens L9 is defined as f9, and the optical imaging system should satisfy a condition of $-2.40 \leq f9/f \leq -0.31$, which specifies the negative refractive power of the ninth lens L9. When exceeding the upper limit specified value, although it is beneficial to the miniaturization of the lens, the negative refractive power of the first lens L1 will be too strong, making it difficult to correct aberrations. Conversely, when exceeding the lower limit specified value, the negative refractive power of the eighth lens L8 will become too weak, making it difficult to control the lens thickness. Preferably, $-1.50 \leq f7/f \leq -0.38$ is satisfied.

An on-axis thickness of the ninth lens L9 is defined as d17, a total optical length of the optical imaging system 10 is defined as TTL, and the optical imaging system should satisfy a condition of $0.00 \leq d17/TTL \leq 0.05$. Within the conditional range, it is beneficial to control the thickness of the lens and the total length of the lens. Preferably, $0.01 \leq d17/TTL \leq 0.04$ is satisfied.

A curvature radius of an object-side surface of the ninth lens L9 is defined as R15, a curvature radius of the image-side surface of the ninth lens L9 is defined as R16, and the optical imaging system should satisfy a condition of −2.84≤ (R15+R16)/(R15−R16)≤1.63, which specifies a shape of the ninth lens L9. Within the range, with the development of lens miniaturization, it is beneficial to correct the problem of axial chromatic aberration. Preferably, −1.78≤ (R15+R16)/ (R15−R16)≤1.31 is satisfied.

In this embodiment, an object-side surface of the ninth lens L9 is convex in a paraxial region, an image-side surface of the ninth lens L9 is concave in a paraxial region, and the ninth lens L9 has a negative refractive power. In other optional embodiments, the object-side surface and image-side surface of the ninth lens L9 can also be set to other concave-convex distributions.

In this embodiment, a focal length of the optical imaging system 10 is defined as f, a focal length of the tenth lens L10 is defined as f10, and the optical imaging system should satisfy a condition of 0.19≤f10/f≤1.11. When exceeding the lower limit specified value, although it is beneficial to the miniaturization of the lens, the positive refractive power of the eleventh lens L11 will be too strong, making it difficult to correct aberrations. Conversely, when exceeding the upper limit specified value, the positive refractive power of the eleventh lens L11 will become too weak, making it difficult to control the lens thickness. Preferably, 0.31≤f10/ f≤0.88 is satisfied.

A curvature radius of the object-side surface of the tenth lens L10 is defined as R17, a curvature radius of the image-side surface of the tenth lens L10 is defined as R18, and the optical imaging should system satisfy a condition of 0.20≤ (R17+R18)/(R17−R18)≤2.56, which specifies a shape of the tenth lens L10. When within the condition range, with the development of miniaturization, it is beneficial to correct the aberration of the off-axis angle. Preferably, 0.32≤(R17+ R18)/(R17−R18)≤2.04 is satisfied.

An on-axis thickness of the tenth lens L10 is defined as d19, a total optical length of the optical imaging system 10 is defined as TTL, and the optical imaging system should satisfy a condition of 0.01≤d19/TTL≤0.04. Within the conditional range, it is beneficial to control the thickness of the lens and the total length of the lens. Preferably, 0.01≤d19/ TTL≤0.03 is satisfied.

In this embodiment, an object-side surface of the tenth lens L10 is concave in a paraxial region, an image-side surface of the tenth lens L10 is convex in a paraxial region, and the tenth lens L10 has a positive refractive power. In other optional embodiments, the object-side surface and image-side surface of the tenth lens L10 can also be set to other concave-convex distributions.

In this embodiment, a focal length of the optical imaging system 10 is defined as f, a focal length of the eleventh lens L11 is defined as f11, and the optical imaging system should satisfy a condition of −2.67≤f11/f≤−0.37. By reasonably distributing the diopter, the system has better imaging quality and lower sensitivity. Preferably, −1.67≤ f11/f≤−0.46 is satisfied.

A curvature radius of the object-side surface of the eleventh lens L11 is defined as R19, a curvature radius of the image-side surface of the eleventh lens L11, and the optical imaging system should satisfy a condition of −8.92≤ (R19+ R20)/(R19−R20)≤−0.76, which specifies a shape of the eleventh lens L11. When within the condition range, with the development of miniaturization, it is beneficial to correct the aberration of the negative off-axis angle. Preferably, −5.58≤ (R19+R20)/(R19−R20)≤−0.95 is satisfied.

An on-axis thickness of the eleventh lens L11 is defined as d21, a total optical length of the optical imaging system 10 is defined as TTL, and the optical imaging system should satisfy a condition of 0.00≤d21/TTL≤0.01. Within the range of the conditional expression, it is beneficial to control the thickness of the lens and the total length of the lens.

In this embodiment, an object-side surface of the eleventh lens L11 is concave in a paraxial region, an image-side surface of the eleventh lens L11 is convex in a paraxial region, and the eleventh lens L11 has a negative refractive power. In other optional embodiments, the object-side surface and image-side surface of the eleventh lens L11 can also be set to other concave-convex distributions.

In this embodiment, a focal length of the optical imaging system 10 is defined as f, a focal length of the twelfth lens L12 is defined as f12, and the optical imaging system should satisfy a condition of 0.26≤f12/f≤2.71, which specifies the positive refractive power of the twelfth lens L12. When exceeding the lower limit specified value, although it is beneficial to the miniaturization of the lens, the positive refractive power of the first lens L1 will be too strong, making it difficult to correct aberrations. Conversely, when exceeding the upper limit specified value, the positive refractive power of the first lens L1 will become too weak, making it difficult to control the lens thickness. Preferably, 0.41≤f12/f≤217 is satisfied.

A curvature radius of the object-side surface of the twelfth lens L12 is defined as R21, a curvature radius of the image-side surface of the twelfth lens L12 is defined as R22, and the optical imaging should satisfy a condition of 0.31≤ (R21+R22)/(R21−R22)≤3.92, which specifies a shape of the twelfth lens L12. When within the condition range, with the development of miniaturization, it is beneficial to correct the aberration of the off-axis angle. Preferably, 0.50≤ (R21+ R22)/(R21−R22)≤ 3.13 is satisfied.

An on-axis thickness of the twelfth lens L12 is defined as d23, a total optical length of the optical imaging system 10 is defined as TTL, and the optical imaging system should satisfy a condition of 0.01≤d23/TTL≤0.03. Within the range of the conditional expression, it is beneficial to control the thickness of the lens and the total length of the lens. Preferably, 0.01≤d23/TTL≤0.02 is satisfied.

An object-side surface of the twelfth lens L12 is convex in a paraxial region, an image-side surface of the twelfth lens L12 is convex in a paraxial region, and the twelfth lens L12 has a positive refractive power. In other optional embodiments, the object-side surface and image-side surface of the twelfth lens L12 can also be set to other concave-convex distributions.

The optical imaging system 10 has good optical performance while meeting the design requirements of variable aperture, long focal length, miniaturization, and low distortion. According to the characteristics of the optical imaging system 10, the optical imaging system 10 is particularly suitable for industrial inspection line-scan lenses for high-pixel applications.

In the following, examples will be used to describe the optical imaging system 10 of the present disclosure. The symbols recorded in each example will be described as follows. The focal length, on-axis distance, curvature radius, on-axis thickness, inflexion point position, and arrest point position are all in units of mm.

TTL: Optical length (the total optical length from the object side surface of the first lens to the image surface of the optical imaging system along the optical axis) in mm.

The F-number (FNO): a ratio of the effective focal length of an optical imaging system to the diameter of the entrance pupil.

Preferably, inflexion points and/or arrest points can be arranged on the object-side surface and/or the image-side surface of the lens, so as to satisfy the demand for high quality imaging. The description below can be referred for specific implementations.

The design data of the optical imaging system 10 in Embodiment 1 of the present disclosure are shown in Table 1.

TABLE 1

| Lens | | R | d | | | nd | | vd |
|---|---|---|---|---|---|---|---|---|
| OBJ | | | dOBJ (WD) | 39 | | | | |
| BS | R1 | INF | dBS | 25 | nBS | 1.5163 | VBS | 64.14 |
| | R2 | INF | d0 | 17.52 | | | | |
| L1 | R3 | −36.630 | d1 | 3.120 | n1 | 1.7783 | v1 | 23.89 |
| L2 | R4 | −177.000 | d3 | 11.930 | n2 | 1.9538 | v2 | 32.31 |
| | R5 | −55.600 | d4 | 4.530 | | | | |
| L3 | R6 | 195.000 | d5 | 1.000 | n3 | 1.4875 | v3 | 70.44 |
| L4 | R7 | 42.160 | d7 | 16.680 | n4 | 1.4970 | v4 | 81.61 |
| | R8 | −91.620 | d8 | 5.180 | | | | |
| L5 | R9 | 64.760 | d9 | 10.950 | n5 | 1.4378 | v5 | 94.52 |
| L6 | R10 | −114.000 | d11 | 1.000 | n6 | 1.8340 | v6 | 37.21 |
| | R11 | −356.380 | d12 | 0.890 | | | | |
| L7 | R12 | 70.340 | d13 | 5.900 | n7 | 1.9229 | v7 | 18.90 |
| L8 | R13 | 830.000 | d15 | 5.770 | n8 | 1.7618 | v8 | 26.61 |
| | R14 | 41.350 | d16 | 25.060 | | | | |
| ST | | INF | dSTOP-L9 | 9.900 | | | | |
| L9 | R15 | −36.630 | d17 | 22.470 | n9 | 1.5831 | v9 | 59.46 |
| | R16 | 830.000 | d18 | 4.330 | | | | |
| L10 | R17 | −133.000 | d19 | 12.390 | n10 | 1.4970 | v10 | 81.61 |
| | R18 | −34.630 | d20 | 0.840 | | | | |
| L11 | R19 | −35.070 | d21 | 4.410 | n11 | 1.5750 | v11 | 41.50 |
| | R20 | −56.520 | d22 | 0.500 | | | | |
| L12 | R21 | 356.380 | d23 | 10.130 | n12 | 1.4970 | v12 | 81.61 |
| | R22 | −82.450 | d24 | 464.960 | | | | |

In the table, meanings of various symbols will be described as follows.

OBJ: Object surface

BS: Beam splitter

ST: Aperture

Gn: The nth lens

R: curvature radius of an optical surface, a central curvature radius for a lens;

R1: curvature radius of the object-side surface of the Beam splitter BS;

R2: curvature radius of the image-side surface of the Beam splitter BS;

R3: curvature radius of the object-side surface of the first lens L1;

R4: curvature radius of a bonding surface of the first lens L1 and the second lens L2;

R5: curvature radius of the image-side surface of the second lens L2;

R6: curvature radius of the object-side surface of the third lens L3;

R7: curvature radius of a bonding surface of the third lens L3 and the fourth lens L4;

R8: curvature radius of the image-side surface of the fourth lens L4;

R9: curvature radius of the object-side surface of the fifth lens L5;

R10: curvature radius of a bonding surface of the fifth lens L5 and the sixth lens L6;

R11: curvature radius of the image-side surface of the sixth lens L6;

R12: curvature radius of an object-side surface of the seventh lens L7;

R13: curvature radius of a bonding surface of the seventh lens L7 and the eighth lens L8;

R14: curvature radius of the image-side surface of the eighth lens L8;

R15: curvature radius of the object-side surface of the ninth lens L9;

R16: curvature radius of the image-side surface of the ninth lens L9;

R17: curvature radius of the object-side surface of the tenth lens L10;

R18: curvature radius of the image-side surface of the tenth lens L10;

R19: curvature radius of the object-side surface of the eleventh lens L11;

R20: curvature radius of the image-side surface of the eleventh lens L11;

R21: curvature radius of the object-side surface of the twelfth lens L12;

R22: curvature radius of the image-side surface of the twelfth lens L12;

d: on-axis thickness of a lens and an on-axis distance between lens;

dOBJ (WD): on-axis distance from the object surface OBJ to the object-side surface of the beam splitter BS;

dBS: on-axis thickness of the beam splitter BS;

d0: on-axis distance from the image-side surface of the beam splitter BS to the object-side surface of the first lens L1;

d1: on-axis thickness of the first lens L1;

d3: on-axis thickness of the second lens L2;

d4: on-axis distance from the image-side surface of the second lens L2 to the object-side surface of the third lens L3;

d5: on-axis thickness of the third lens L3;

d7: on-axis thickness of the fourth lens L4;

d8: on-axis distance from the image-side surface of the fourth lens L4 to the object-side surface of the fifth lens L5;

d9: on-axis thickness of the fifth lens L5;

d11: on-axis thickness of the sixth lens L6;

d12: on-axis distance from the image-side surface of the sixth lens L6 to the object-side surface of the seventh lens L7;

d13: on-axis thickness of the seventh lens L7;

d15: on-axis thickness of the eighth lens L8;

d16: on-axis distance from the image-side surface of the eighth lens L8 to the object-side surface of the aperture;

d17: on-axis thickness of the ninth lens L9;

d18: on-axis distance from the image-side surface of the ninth lens L9 to the object-side surface of the tenth lens L10;

d19: on-axis thickness of the tenth lens L10;

d20: on-axis distance from the image-side surface of the tenth lens L10 to the object-side surface of the eleventh lens L11;

d21: on-axis thickness of the eleventh lens L11;

d22: on-axis distance from the image-side surface of the eleventh lens L11 to the object-side surface of the twelfth lens L12;

d23: on-axis thickness of the twelfth lens L12;

d24: on-axis distance from the image-side surface of the twelfth lens L12 to the image surface Si;

nd: refractive index of the d line;

ndBS: refractive index of the d line of the beam splitter BS;

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

nd6: refractive index of the d line of the sixth lens L6;

nd7: refractive index of the d line of the seventh lens L7;

nd8: refractive index of the d line of the eighth lens L8;

nd9: refractive index of the d line of the ninth lens L9;

nd10: refractive index of the d line of the tenth lens L10;

nd11: refractive index of the d line of the eleventh lens L11;

nd12: refractive index of the d line of the twelfth lens L12;

vd: abbe number;

vBS: abbe number of the beam splitter BS;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

v8: abbe number of the eighth lens L8;

v9: abbe number of the ninth lens L9;

v10: abbe number of the tenth lens L10;

v11: abbe number of the eleventh lens L11;

v12: abbe number of the twelfth lens L12.

Figure 2:
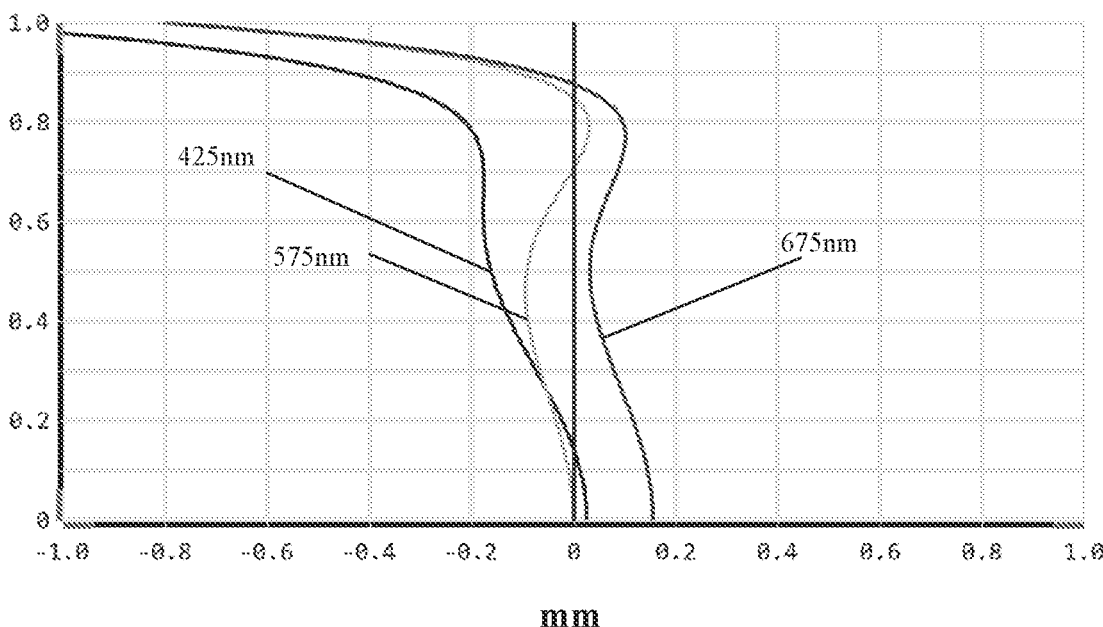
FIG. 2 is a schematic diagram of a longitudinal aberration of the optical imaging system shown in FIG. 1.
Figure 3:
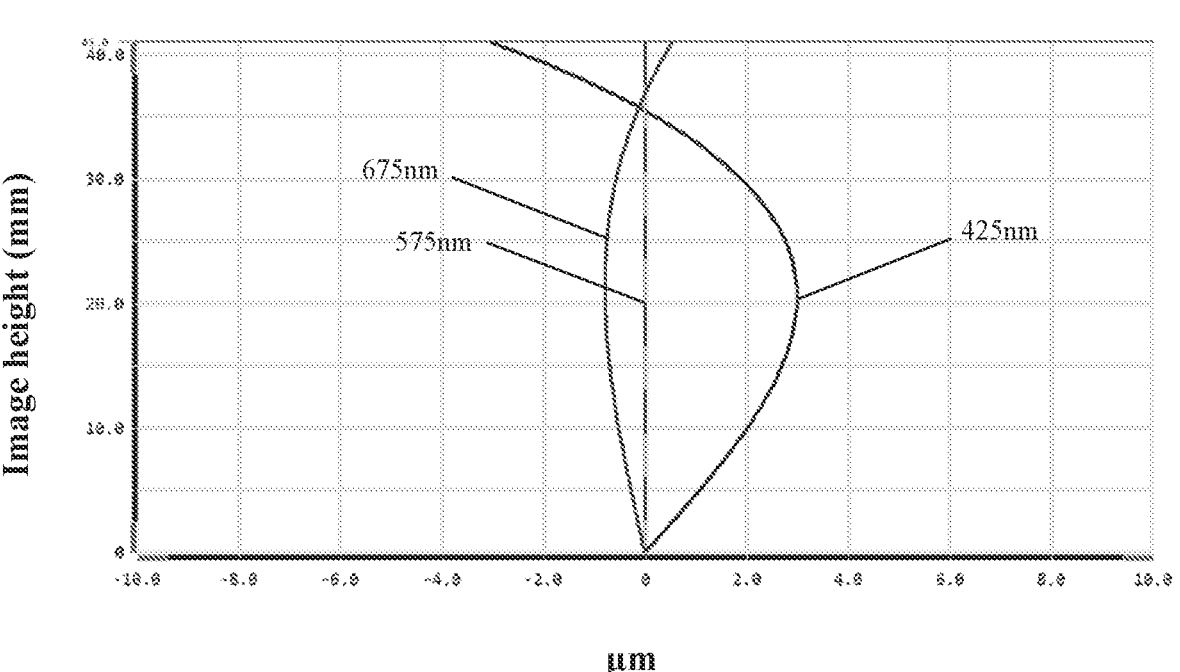
FIG. 3 is a schematic diagram of a lateral color of the optical imaging system shown in FIG. 1.
Figure 4:
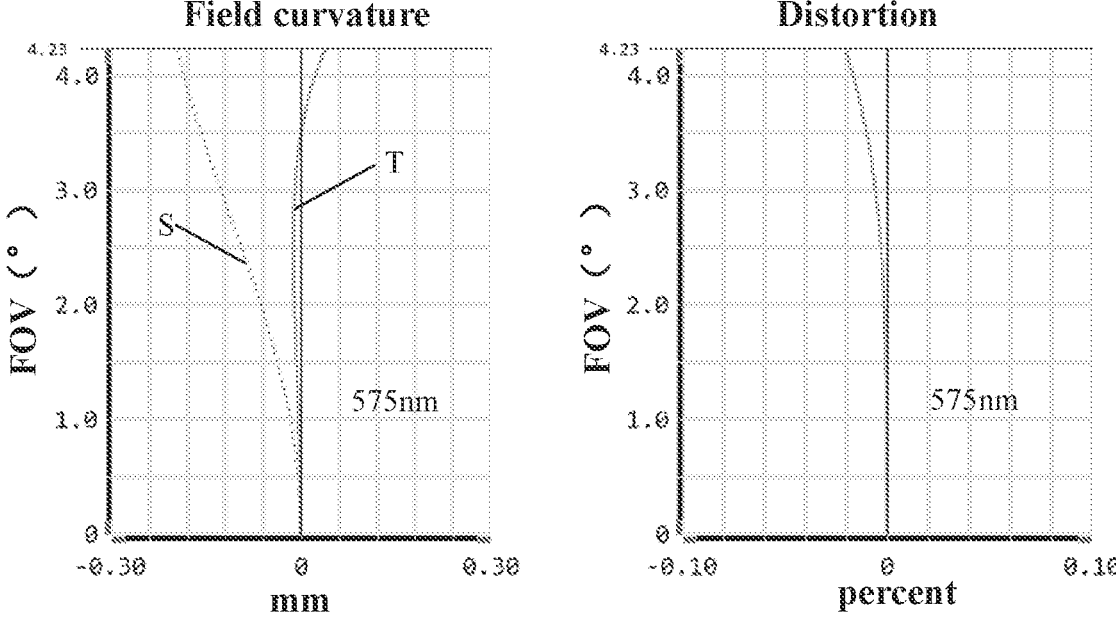
FIG. 4 is a schematic diagram of a field curvature and a distortion of the optical imaging system shown in FIG. 1.

FIG. 2 and FIG. 3 illustrate a longitudinal aberration and a lateral color with wavelengths of 425 nm, 575 nm, and 675 nm after passing the optical imaging system 10 according to Embodiment 1, respectively. FIG. 4 illustrates a field curvature and a distortion with a wavelength of 575 nm after passing the optical imaging system 10 according to Embodiment 1. A field curvature S in FIG. 4 is a field curvature in a sagittal direction, and T is a field curvature in a tangential direction.

Table 5 in the following shows various values of Embodiments 1, 2, 3, 4 and values corresponding to parameters which are specified in the above conditions.

As shown in Table 1, Embodiment 1 satisfies the above conditions.

In this Embodiment, an entrance pupil diameter of the optical imaging system is 61.732 mm and 33.469 mm, an image height of 1.0H is 41.000 mm, a FOV (field of view) in a diagonal direction is 4.23°. Thus, the optical imaging system 10 is designed to meet the design requirements of variable aperture, long focal length, miniaturization, and low distortion. Its on-axis and off-axis chromatic aberrations are fully corrected, thereby achieving excellent optical characteristics.

Embodiment 2

Embodiment 2 is basically the same as Embodiment 1 and involves symbols having the same meanings as Embodiment 1, and only differences therebetween will be described in the following.

In this embodiment, the image-side surface of the ninth lens L9 is convex at the paraxial region, and the object-side surface of the twelfth lens L12 is concave at the paraxial region.

Figure 5:
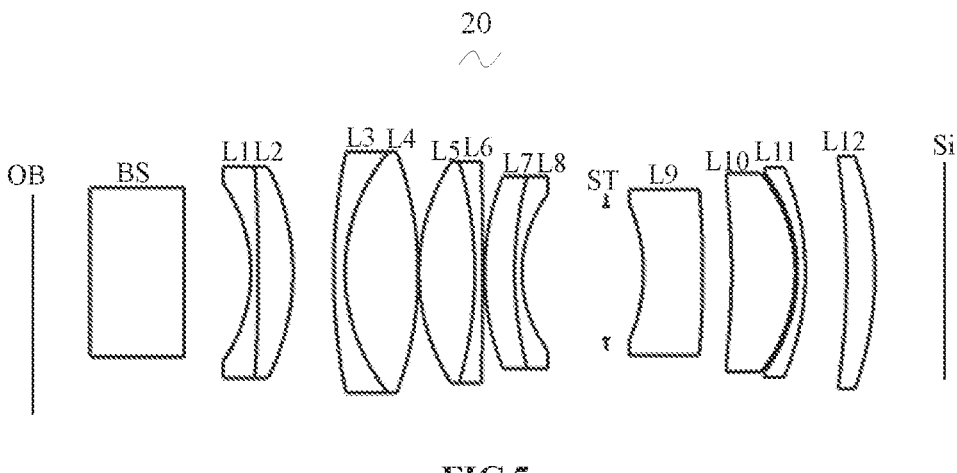
FIG. 5 is a schematic diagram of a structure of an optical imaging system 20 according to Embodiment 2 of the present disclosure.

FIG. 5 shows the optical imaging system 20 according to Embodiment 2 of the present disclosure.

The design data of the optical imaging system 20 in Embodiment 2 of the present disclosure are shown in Table 2.

TABLE 2

| Lens | | R | | d | | nd | | vd |
| --- | --- | --- | --- | --- | --- | --- | --- | --- |
| OBJ | | | dOBJ (WD) | 72.6506764 | | | | |
| BS | R1 | INF | dBS | 25 | nBS | 1.5163 | vBS | 64.14 |
| | R2 | INF | d0 | 17.52 | | | | |
| L1 | R3 | −37.796 | d1 | 1.996 | n1 | 1.8063 | v1 | 25.38 |
| L2 | R4 | −370.982 | d3 | 9.088 | n2 | 2.0010 | v2 | 29.16 |
| | R5 | −57.343 | d4 | 10.845 | | | | |
| L3 | R6 | 143.915 | d5 | 3.000 | n3 | 1.4875 | v3 | 70.44 |
| L4 | R7 | 46.016 | d7 | 19.357 | n4 | 1.4970 | v4 | 81.61 |
| | R8 | −83.566 | d8 | 0.199 | | | | |
| L5 | R9 | 50.256 | d9 | 14.723 | n5 | 1.4378 | v5 | 94.52 |
| L6 | R10 | −95.999 | d11 | 2.000 | n6 | 1.7340 | v6 | 51.49 |
| | R11 | −2795.700 | d12 | 0.597 | | | | |
| L7 | R12 | 61.965 | d13 | 7.904 | n7 | 1.9229 | v7 | 18.90 |
| L8 | R13 | 88.989 | d15 | 1.934 | n8 | 1.6643 | v8 | 35.48 |
| | R14 | 31.622 | d16 | 22.247 | | | | |
| ST | | | STOP-L9 | 9.903 | | | | |
| L9 | R15 | −41.127 | d17 | 15.651 | n9 | 1.5935 | v9 | 67.29 |
| | R16 | −236.771 | d18 | 7.634 | | | | |
| L10 | R17 | −189.074 | d19 | 16.819 | n10 | 1.4970 | v10 | 81.61 |
| | R18 | −39.169 | d20 | 0.592 | | | | |
| L11 | R19 | −40.419 | d21 | 2.138 | n11 | 1.7015 | v11 | 41.15 |
| | R20 | −63.777 | d22 | 10.857 | | | | |

TABLE 2-continued

| Lens | | R | | d | | nd | | vd |
|---|---|---|---|---|---|---|---|---|
| L12 | R21 | −186.434 | d23 | 7.515 | n12 | 1.6209 | v12 | 63.83 |
| | R22 | −83.176 | d24 | 479.038 | | | | |

Figure 6:
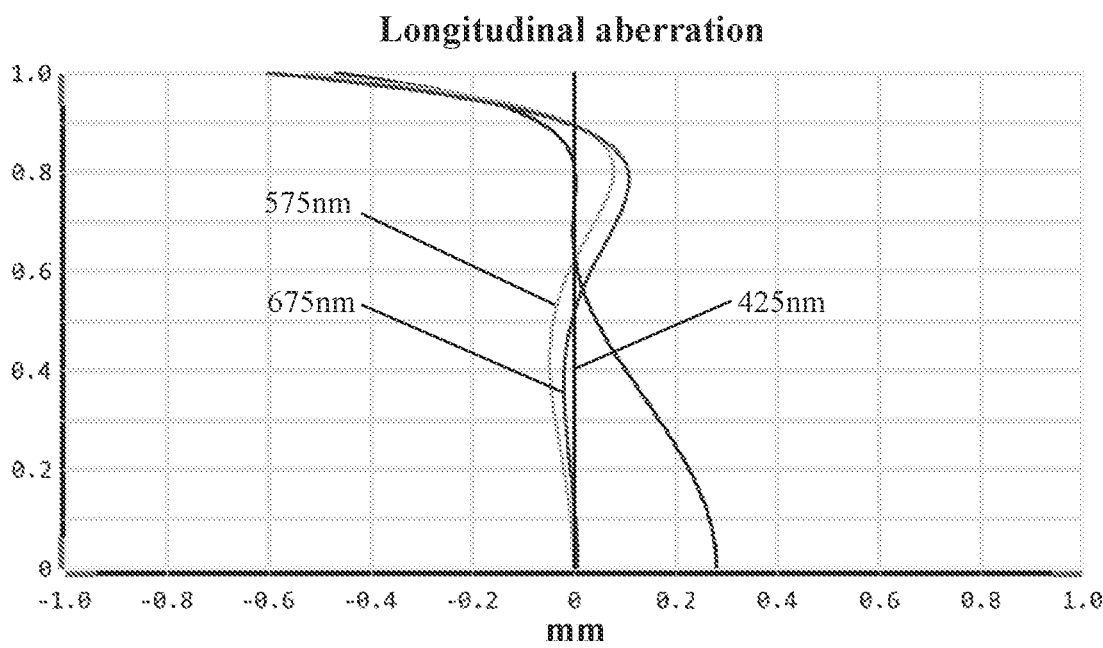
FIG. 6 is a schematic diagram of a longitudinal aberration of the optical imaging system shown in FIG. 5.
Figure 7:
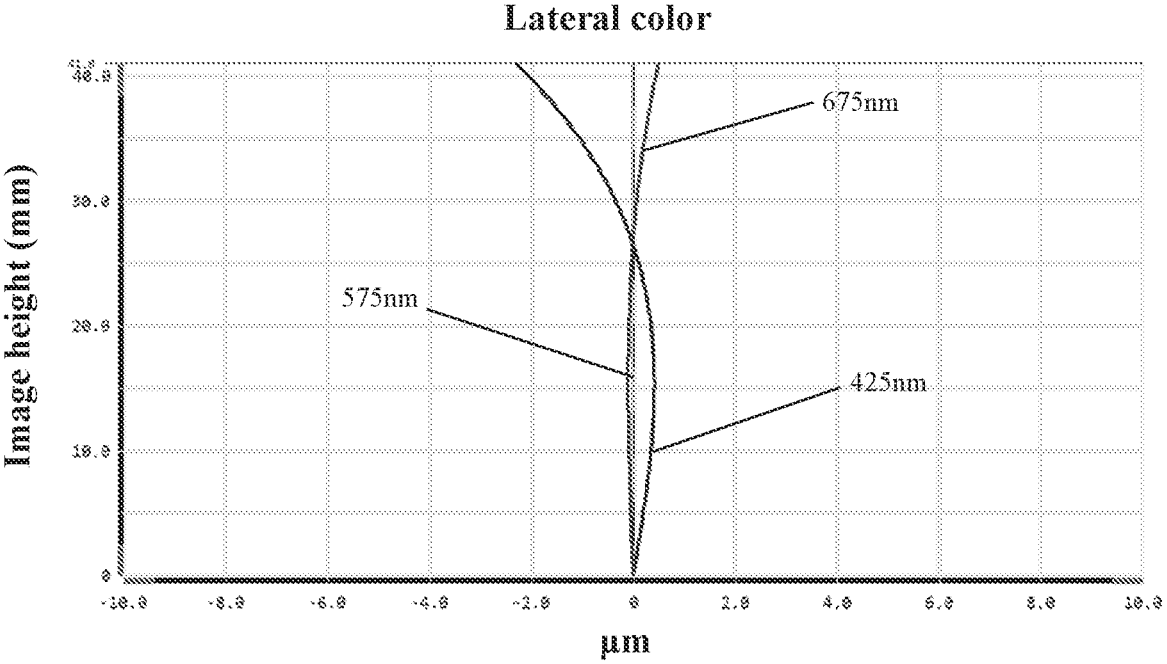
FIG. 7 is a schematic diagram of a lateral color of the optical imaging system shown in FIG. 5.
Figure 8:
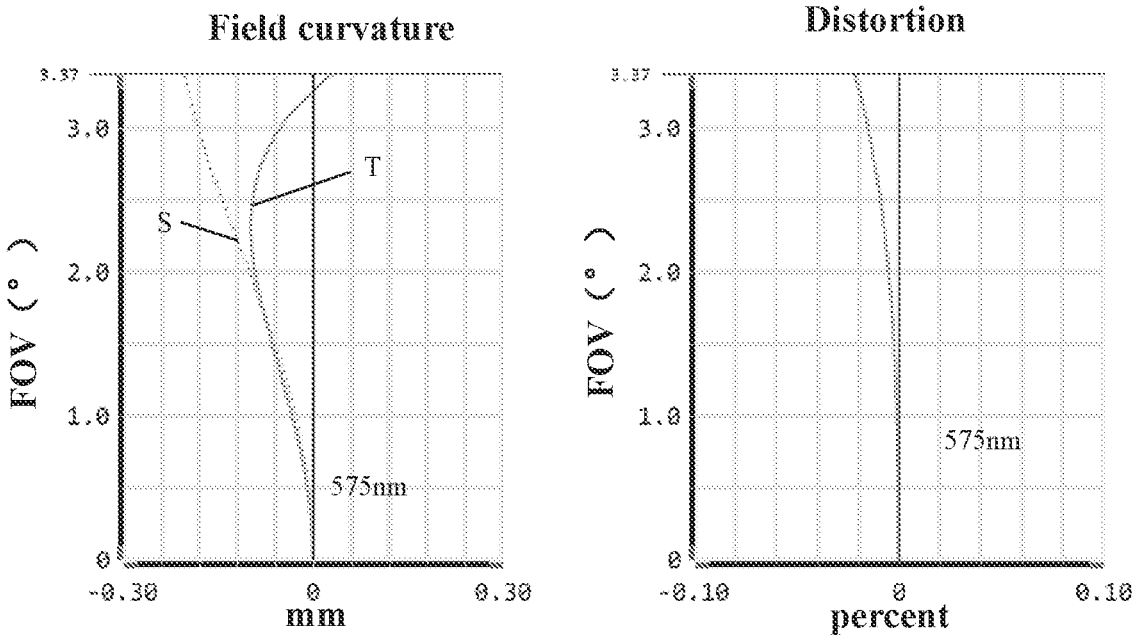
FIG. 8 is a schematic diagram of a field curvature and a distortion of the optical imaging system shown in FIG. 5.

FIG. 6 and FIG. 7 illustrate a longitudinal aberration and a lateral color of light with wavelengths of 425 nm, 575 nm and 675 nm after passing the optical imaging system 20 according to Embodiment 2. FIG. 8 illustrates a field curvature and a distortion of light with a wavelength of 575 nm after passing the optical imaging system 20 according to Embodiment 2. A field curvature S in FIG. 8 is a field curvature in a sagittal direction, and T is a field curvature in a tangential direction.

Table 5 in the following shows various values of Embodiments 1, 2, 3, 4 and values corresponding to parameters which are specified in the above conditions.

As shown in Table 2, Embodiment 2 satisfies the above conditions.

In this embodiment, an entrance pupil diameter of the optical imaging system is 67.894 mm and 42.098 mm, an image height of 1.0H is 41.000 mm, a FOV (field of view) in the diagonal direction is 6.74°. Thus, the optical imaging system 20 is designed to meet the design requirements of variable aperture, long focal length, and miniaturization. Its on-axis and off-axis chromatic aberrations are fully corrected, thereby achieving excellent optical characteristics.

Embodiment 3

Figure 9:
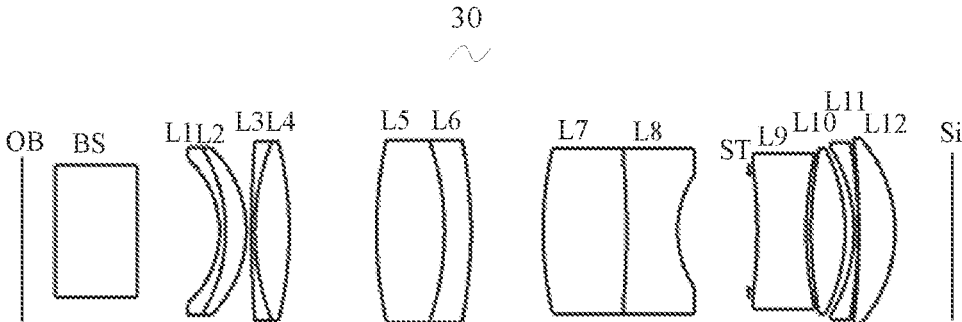
FIG. 9 is a schematic diagram of a structure of an optical imaging system 30 according to Embodiment 3 of the present disclosure.

Embodiment 3 is basically the same as Embodiment 1 and involves symbols having the same meanings as Embodiment 1. The structural form of the optical imaging system 30 according to Embodiment 3 is shown in FIG. 9, and only differences therebetween will be described in the following.

Figure 12:
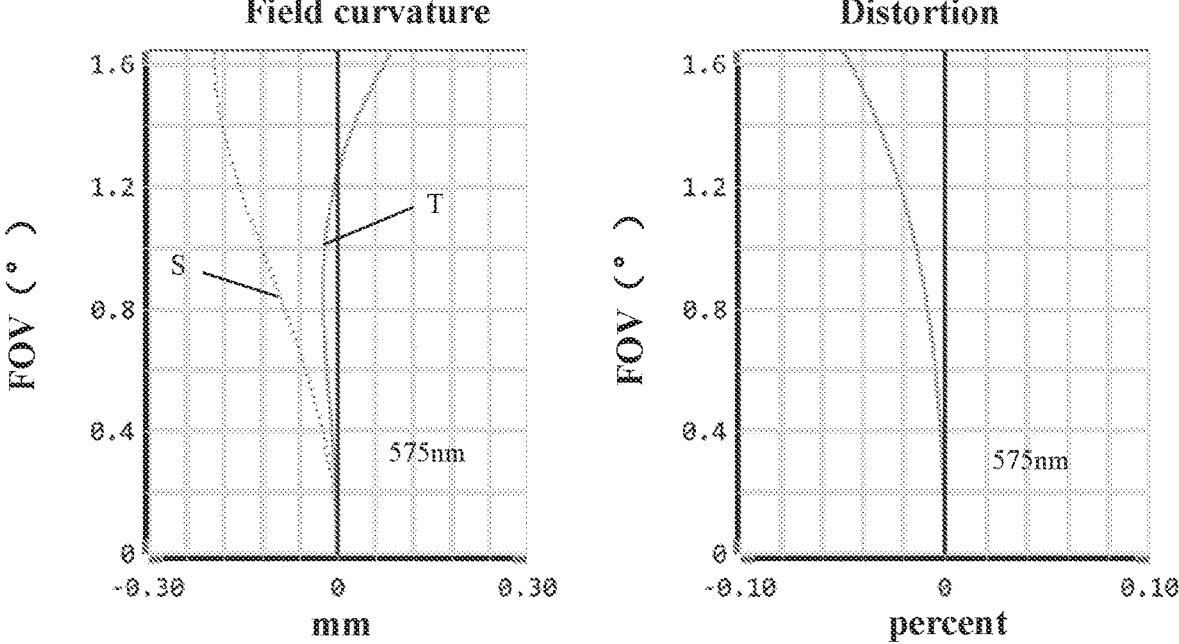
FIG. 12 is a schematic diagram of a field curvature and a distortion of the optical imaging system 40 shown in FIG. 9.

Table 3 shows design data of an optical imaging system 30 in Embodiment 3 of the present disclosure.

nm and 675 nm after passing the optical imaging system 30 according to Embodiment 3. FIG. 12 illustrates a field curvature and a distortion of light with a wavelength of 575 nm after passing the optical imaging system 30 according to Embodiment 3. A field curvature S in FIG. 12 is a field curvature in a sagittal direction, and T is a field curvature in a tangential direction.

Table 5 in the following shows various values of Embodiments 1, 2, 3, 4 and values corresponding to parameters which are specified in the above conditions.

As shown in Table 3, Embodiment 3 satisfies the above conditions.

In this embodiment, an entrance pupil diameter of the optical imaging system is 122.283 mm and 86.921 mm. That is, a variable aperture, used to change the depth of field during measurement. An image height of 1.0H is 41.000 mm, and a FOV (field of view) in the diagonal direction is 3.29°. Thus, the optical imaging system 30 is designed to meet the design requirements of variable aperture, long focal length, and miniaturization. Its on-axis and off-axis chromatic aberrations are fully corrected, thereby achieving excellent optical characteristics.

Embodiment 4

Figure 13:
FIG. 13 is a schematic diagram of a structure of an optical imaging system according to Embodiment 4 of the present disclosure.
Figure 13:
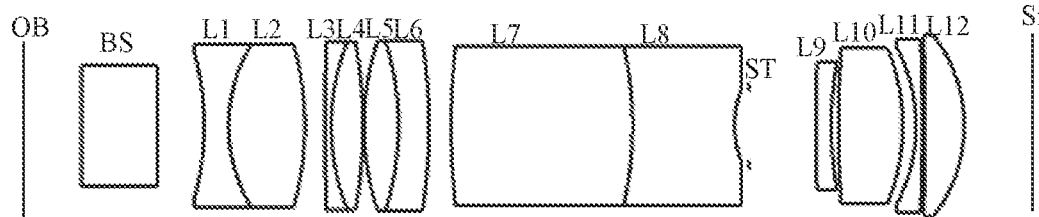

Embodiment 4 is basically the same as Embodiment 1 and involves symbols having the same meanings as Embodiment 1. The structural form of the optical imaging system 40 according to Embodiment 4 is shown in FIG. 13, and only differences therebetween will be described in the following.

In this embodiment, the image-side surface of the first lens L1 is concave at the paraxial region, the object-side

TABLE 3

| Lens | | R | | d | | nd | | vd |
|---|---|---|---|---|---|---|---|---|
| OBJ | | | dOBJ (WD) | 34.7756785 | | | | |
| BS | R1 | INF | dBS | 25 | nBS | 1.5163 | vBS | 64.14 |
| | R2 | INF | d0 | 25.0381441 | | | | |
| L1 | R3 | −27.352 | d1 | 1.823 | n1 | 1.7495 | v1 | 34.99 |
| L2 | R4 | −44.088 | d3 | 6.318 | n2 | 1.8340 | v2 | 37.21 |
| | R5 | −32.444 | d4 | 1.631 | | | | |
| L3 | R6 | 346.226 | d5 | 1.000 | n3 | 1.5831 | v3 | 59.46 |
| L4 | R7 | 66.666 | d7 | 10.495 | n4 | 1.4378 | v4 | 94.52 |
| | R8 | −101.240 | d8 | 26.527 | | | | |
| L5 | R9 | 115.097 | d9 | 20.724 | n5 | 1.4378 | v5 | 94.52 |
| L6 | R10 | −76.518 | d11 | 8.015 | n6 | 2.1042 | v6 | 17.02 |
| | R11 | −127.242 | d12 | 22.003 | | | | |
| L7 | R12 | 99.696 | d13 | 25.382 | n7 | 1.9460 | v7 | 17.94 |
| L8 | R13 | −209.988 | d15 | 15.533 | n8 | 1.6889 | v8 | 31.18 |
| | R14 | 28.702 | d16 | 21.646 | | | | |
| ST | | | STOP-G9 | 2.618 | | | | |
| L9 | R15 | −137.352 | d17 | 14.870 | n9 | 1.5935 | v9 | 67.29 |
| | R16 | 95.180 | d18 | 1.496 | | | | |
| L10 | R17 | 118.276 | d19 | 10.347 | n10 | 1.5935 | v10 | 67.29 |
| | R18 | −50.513 | d20 | 2.767 | | | | |
| L11 | R19 | −44.080 | d21 | 1.200 | n11 | 1.5750 | v11 | 41.50 |
| | R20 | −134.120 | d22 | 0.299 | | | | |
| L12 | R21 | −209.864 | d23 | 10.978 | n12 | 1.4565 | v12 | 90.27 |
| | R22 | −39.292 | d24 | 551.690 | | | | |

Figure 10:
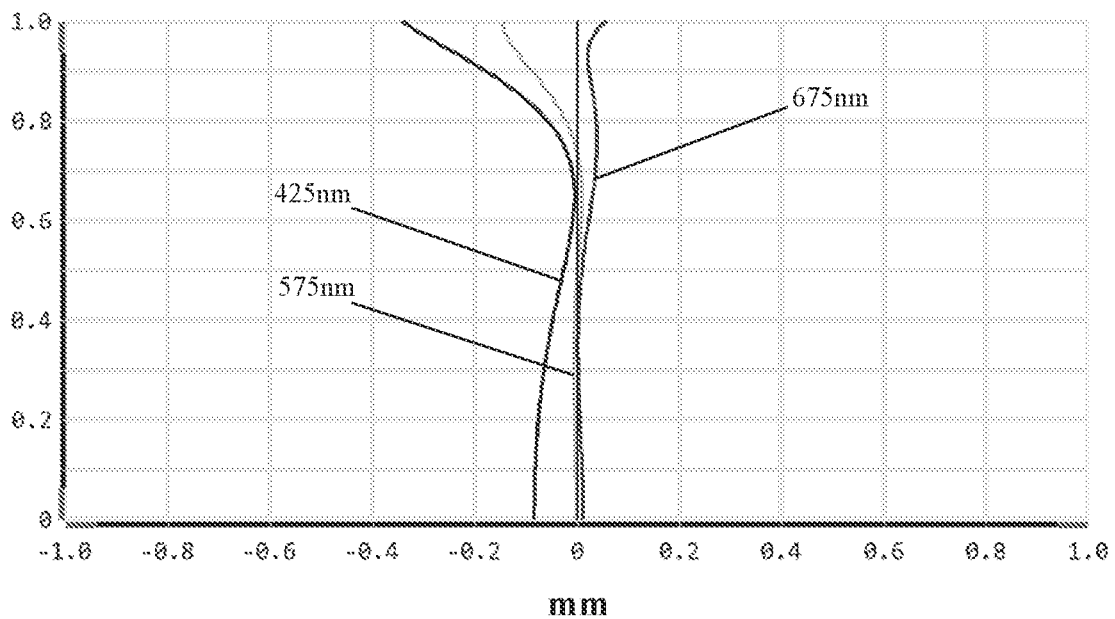
FIG. 10 is a schematic diagram of a longitudinal aberration of the optical imaging system shown in FIG. 9.
Figure 11:
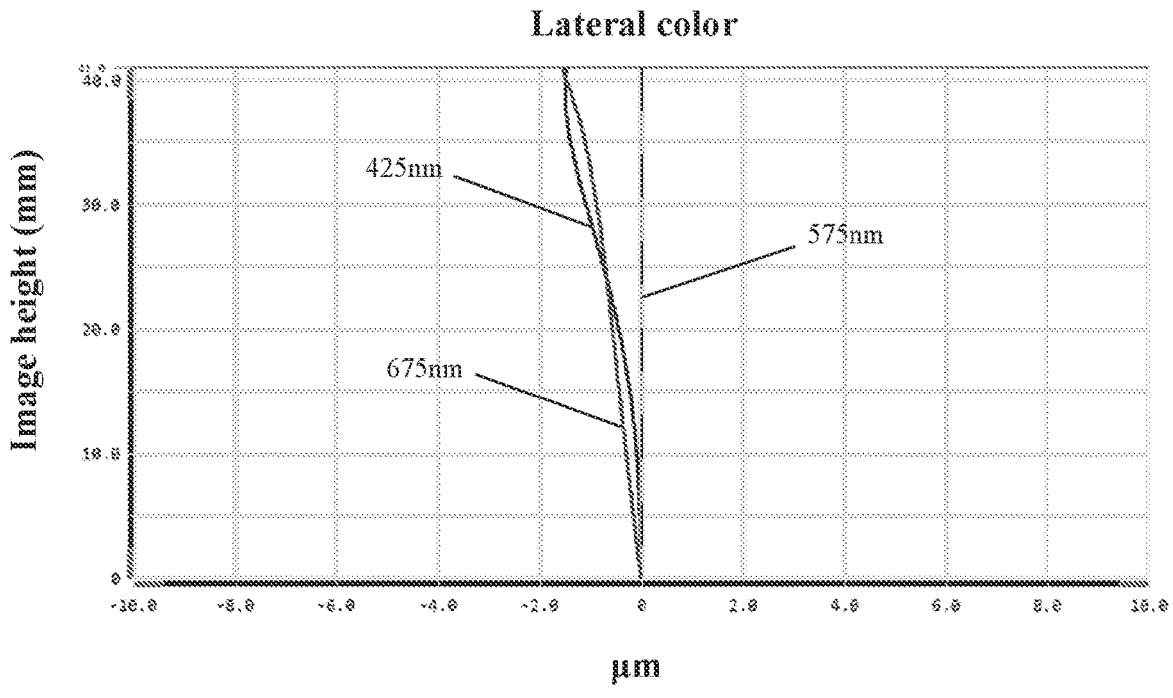
FIG. 11 is a schematic diagram of a lateral color of the optical imaging system shown in FIG. 9.

FIG. 10 and FIG. 11 illustrate a longitudinal aberration and a lateral color of light with wavelengths of 425 nm, 575 surface of the second lens L2 is convex at the paraxial region, the image-side surface of the seventh lens L7 is convex at the paraxial region, the object-side surface of the eighth lens L8 is concave at the paraxial region, the object-side surface of the ninth lens L9 is convex at the paraxial region, the object-side surface of the tenth lens L10 is convex at the paraxial region, and the object-side surface of the twelfth lens L12 is concave at the paraxial region.

Table 4 shows design data of an optical imaging system 40 in Embodiment 4 of the present disclosure.

TABLE 4

| Lens | | R | | d | | nd | | vd |
|---|---|---|---|---|---|---|---|---|
| OBJ | | | dOBJ (WD) | 44.1797216 | | | | |
| BS | R1 | INF | dBS | 25 | nBS | 1.5163 | vBS | 64.14 |
| | R2 | INF | d0 | 15.3766273 | | | | |
| L1 | R3 | −81.067 | d1 | 8.072 | n1 | 1.8537 | v1 | 40.58 |
| L2 | R4 | 47.519 | d3 | 25.056 | n2 | 1.8839 | v2 | 37.20 |
| | R5 | −88.801 | d4 | 6.639 | | | | |
| L3 | R6 | 875.891 | d5 | 2.000 | n3 | 1.6127 | v3 | 58.58 |
| L4 | R7 | 66.840 | d7 | 10.491 | n4 | 1.4378 | v4 | 94.52 |
| | R8 | −140.612 | d8 | 0.300 | | | | |
| L5 | R9 | 80.546 | d9 | 11.356 | n5 | 1.4970 | v5 | 81.61 |
| L6 | R10 | −84.862 | d11 | 10.013 | n6 | 2.1042 | v6 | 17.02 |
| | R11 | −166.937 | d12 | 7.325 | | | | |
| L7 | R12 | 223.516 | d13 | 59.660 | n7 | 1.9591 | v7 | 17.47 |
| L8 | R13 | −104.474 | d15 | 33.568 | n8 | 1.6889 | v8 | 31.18 |
| | R14 | 30.275 | d16 | 4.731 | | | | |
| ST | | | STOP-G9 | 22.229 | | | | |
| L9 | R15 | 2547.006 | d17 | 4.810 | n9 | 1.5933 | v9 | 67.23 |
| | R16 | 107.492 | d18 | 2.399 | | | | |
| L10 | R17 | 304.220 | d19 | 21.104 | n10 | 1.5942 | v10 | 67.30 |
| | R18 | −61.596 | d20 | 4.372 | | | | |
| L11 | R19 | −50.333 | d21 | 2.000 | n11 | 1.6134 | v11 | 44.11 |
| | R20 | −749.386 | d22 | 1.000 | | | | |
| L12 | R21 | −1056.476 | d23 | 12.849 | n12 | 1.5691 | v12 | 71.30 |
| | R22 | −44.394 | d24 | 476.165 | | | | |

Figure 14:
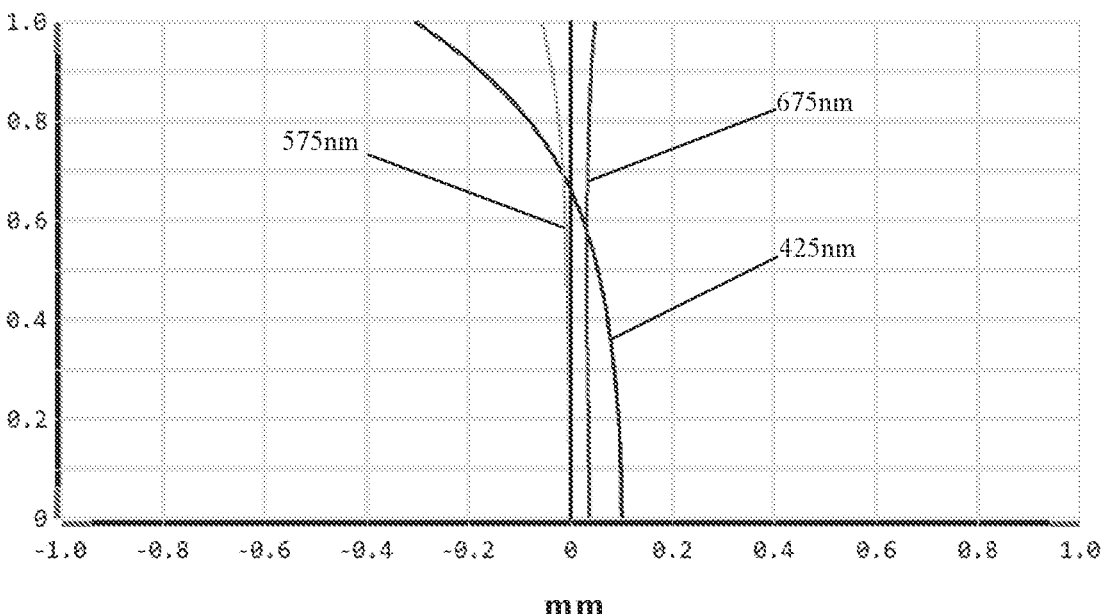
FIG. 14 is a schematic diagram of a longitudinal aberration of the optical imaging system shown in FIG. 13.
Figure 15:
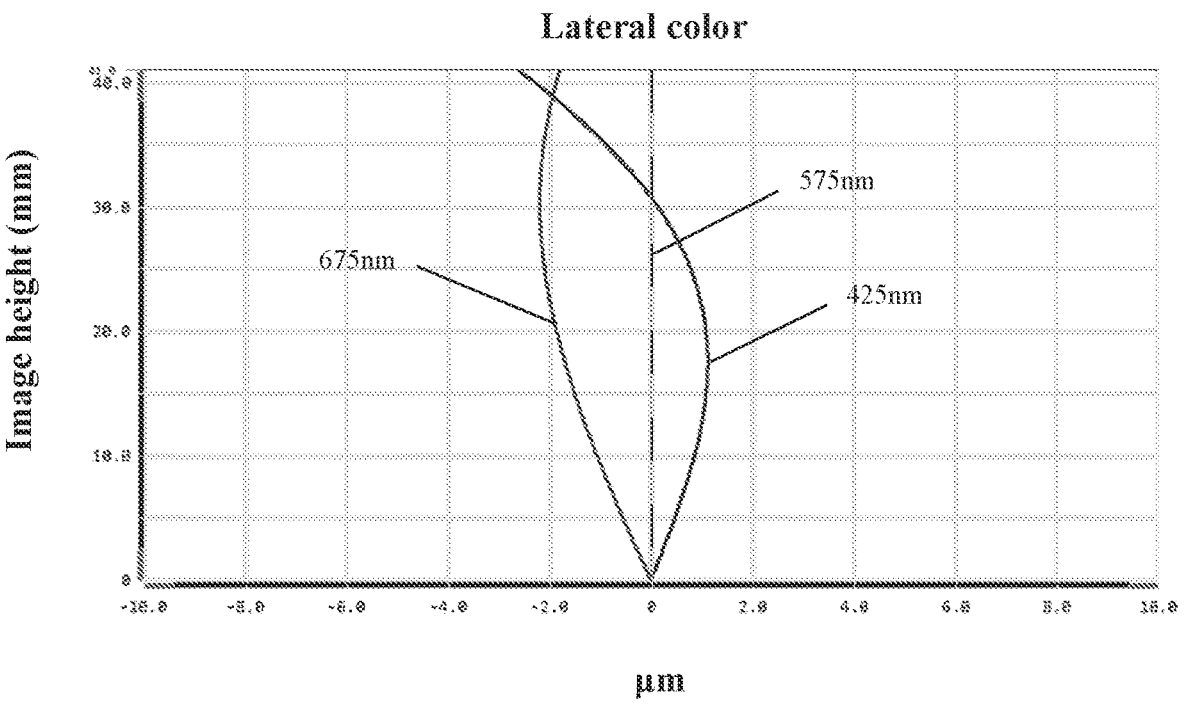
FIG. 15 is a schematic diagram of a lateral color of the optical imaging system shown in FIG. 13.
Figure 16:
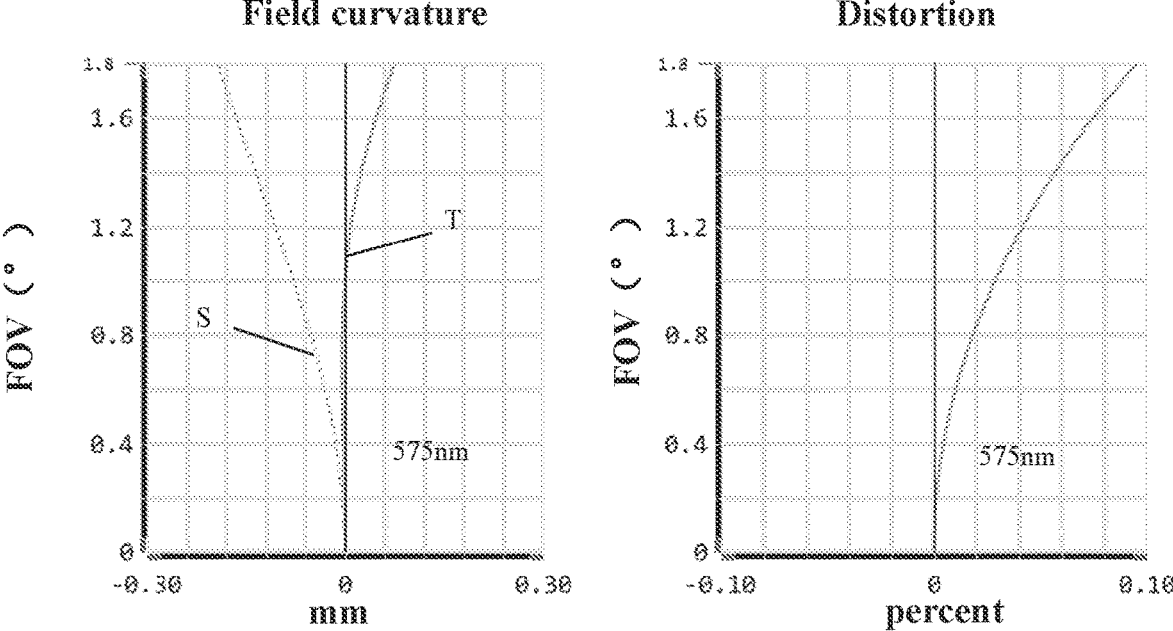
FIG. 16 is a schematic diagram of a field curvature and a distortion of the optical imaging system shown in FIG. 13.

FIG. 14 and FIG. 15 illustrate a longitudinal aberration and a lateral color of light with wavelengths of 425 nm, 575 nm and 675 nm after passing the optical imaging system 40 according to Embodiment 4. FIG. 16 illustrates a field curvature and a distortion of light with a wavelength of 575 nm after passing the optical imaging system 40 according to Embodiment 4. A field curvature S in FIG. 16 is a field curvature in a sagittal direction, and T is a field curvature in a tangential direction.

Table 5 in the following shows various values of Embodiments 1, 2, 3, 4 and values corresponding to parameters which are specified in the above conditions.

As shown in Table 4, Embodiment 4 satisfies the above conditions.

In this embodiment, an entrance pupil diameter of the optical imaging system is 18.018 mm and 5.381 mm. That is, a variable aperture, used to change the depth of field during measurement. An image height of 1.0H is 41.000 mm, a FOV (field of view) in the diagonal direction is 3.60°. Thus, the optical imaging system 40 is designed to meet the design requirements of variable aperture, long focal length, and miniaturization. Its on-axis and off-axis chromatic aberrations are fully corrected, thereby achieving excellent optical characteristics.

Table 5 in the following lists the values corresponding to each conditional expression in this embodiment according to the above conditional expressions. Obviously, the optical imaging system of this embodiment satisfies the above conditional expressions.

TABLE 5

| Parameters and conditions | Embodiment 1 | Embodiment 2 | Embodiment 3 | Embodiment 4 |
|---|---|---|---|---|
| f10 − 12/f | 0.63 | 0.90 | 0.39 | 0.52 |
| f7 − 8/(d13 + d15) | −21.62 | −14.00 | −3.01 | −1.04 |
| d17/d18 | 5.19 | 2.05 | 9.94 | 2.01 |

TABLE 5-continued

| Parameters and conditions | Embodiment 1 | Embodiment 2 | Embodiment 3 | Embodiment 4 |
|---|---|---|---|---|
| d1 + d3)/d23' | 3.32 | 1.02 | 4.99 | 4.99 |
| v5 − v6 | 57.313 | 43.038 | 77.505 | 64.594 |
| d0/L | 0.164 | 0.259 | 0.120 | 0.132 |
| f | 129.948 | 129.948 | 159.731 | 157.808 |
| f1 | −59.767 | −52.201 | −100.660 | −34.050 |
| f2 | 80.936 | 66.640 | 117.918 | 38.263 |
| f3 | −110.472 | −140.037 | −141.614 | −118.075 |
| f4 | 60.556 | 62.775 | 93.531 | 105.026 |
| f5 | 96.059 | 77.676 | 108.484 | 85.017 |
| f6 | −201.002 | −135.307 | −188.872 | −166.401 |
| f7 | 82.685 | 193.188 | 74.169 | 81.208 |
| f8 | −57.165 | −74.717 | −35.628 | −30.859 |
| f9 | −59.525 | −86.356 | −92.432 | −189.120 |
| f10 | 90.350 | 95.754 | 60.974 | 88.017 |
| f11 | −173.486 | −163.226 | −114.566 | −87.927 |
| f12 | 135.655 | 235.066 | 103.728 | 80.984 |
| Fno(1) = (f/ENPD) | 2.11 | 1.91 | 1.31 | 1.45 |
| Fno(2) = (f/ENPD) | 3.88 | 3.09 | 1.84 | 2.04 |
| TTL | 621.940 | 644.038 | 757.362 | 726.142 |
| IH | 41.000 | 41.000 | 41.000 | 41.000 |
| FOV | 4.23° | 6.74° | 3.29° | 3.60° |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. An optical imaging system comprising, from an object side to an image side:

a first lens having a negative refractive power;

a second lens having a positive refractive power;

a third lens having a negative refractive power;

a fourth lens having a positive refractive power;

a fifth lens having a positive refractive power;

a sixth lens having a negative refractive power;

a seventh lens having a positive refractive power;

an eighth lens having a negative refractive power;

a ninth lens having a negative refractive power;

a tenth lens having a positive refractive power;

an eleventh lens having a negative refractive power; and a twelfth lens having a positive refractive power;

wherein the optical imaging system satisfies following conditions:

$$0.38 \le f10 - 12/f \le 0.90;$$

$$-21.70 \le f7 - 8/(d13 + d15) \le -1.00;$$

$$2.00 \le d17/d18 \le 10.00;$$

$$\text{and } 1.00 \le (d1 + d3)/d23' \le 5.00;$$

where f denotes a focal length of the optical imaging system;

f10-12 denotes a combined focal length of the tenth lens, the eleventh lens and the twelfth lens;

f7-8 denotes a combined focal length of the seventh lens and the eighth lens;

d1 denotes an on-axis thickness of the first lens;

d3 denotes an on-axis thickness of the second lens;

d23' denotes an on-axis distance from the image-side surface of the second lens to the object-side surface of the third lens;

d13 denotes an on-axis thickness of the seventh lens;

d15 denotes an on-axis thickness of the eighth lens;

d17 denotes an on-axis thickness of the ninth lens; and d18 denotes an on-axis distance from the image-side surface of the ninth lens to the object-side surface of the tenth lens.

2. The optical imaging system according to claim 1, further satisfying following conditions:

$$43.00 \le v5 - v6 \le 77.60;$$

where v5 denotes an abbe number of the fifth lens; and v6 denotes an abbe number of the sixth lens.

3. The optical imaging system according to claim 1, further comprising a Beam splitter, the optical imaging system further satisfies following conditions:

$$0.12 \le d0/L \le 0.26;$$

where d0 denotes an on-axis distance from an object surface of the optical imaging system to the object-side surface of the beam splitter; and L denotes an on-axis distance from the object surface of the optical imaging system to the image-side surface of the twelfth lens.

4. The optical imaging system according to claim 1, wherein an object-side surface of the first lens is concave in a paraxial region; and the optical imaging system further satisfies following conditions:

$$-1.26 \le f1/f \le -0.14;$$

$$-8.54 \le (R3 + R4)/(R3 - R4) \le 0.39;$$

$$0.00 \le d1/TTL \le 0.02;$$

where f1 denotes a focal length of the first lens;

TTL denotes a total optical length of the optical imaging system;

R3 denotes a curvature radius of the object-side surface of the first lens; and

R4 denotes a curvature radius of a bonding surface of the first lens and the second lens.

5. The optical imaging system according to claim 1, wherein an image-side surface of the second lens is convex in a paraxial region; and the optical imaging system further satisfies following conditions:

$$0.12 \le f2/f \le 1.11;$$

$$-0.61 \le (R4 + R5)/(R4 - R5) \le 9.86;$$

$$0.00 \le d3/TTL \le 0.05;$$

where f2 denotes a focal length of the second lens;

TTL denotes a total optical length of the optical imaging system;

R4 denotes a curvature radius of a bonding surface of the first lens and the second lens; and R5 denotes a curvature radius of the image-side surface of the second lens.

6. The optical imaging system according to claim 1, wherein an object-side surface of the third lens is convex in a paraxial region, an image-side surface of the third lens is concave in a paraxial region; and the optical imaging system further satisfies following conditions:

$$-2.16 \le f3/f \le -0.50;$$

$$0.58 \le (R6 + R7)/(R6 - R7) \le 2.91;$$

$$0.00 \le d5/TTL \le 0.01;$$

where f3 denotes a focal length of the third lens;

d5 denotes an on-axis thickness of the third lens;

TTL denotes a total optical length of the optical imaging system;

R6 denotes a curvature radius of the object-side surface of the third lens; and

R7 denotes a curvature radius of a bonding surface of the third lens and the fourth lens.

7. The optical imaging system according to claim 1, wherein an object-side surface of the fourth lens is convex in a paraxial region, an image-side surface of the fourth lens is convex in a paraxial region; and the optical imaging system further satisfies following conditions:

$$0.23 \le f4/f \le 1.00;$$

$$-0.74 \le (R7 + R8)/(R7 - R8) \le -0.14;$$

$$0.01 \le d7/TTL \le 0.05;$$

where
f4 denotes a focal length of the fourth lens;
d7 denotes an on-axis thickness of the fourth lens;
TTL denotes a total optical length of the optical imaging system;
R7 denotes a curvature radius of a bonding surface of the third lens and the fourth lens; and
R8 denotes a curvature radius of the image-side surface of the fourth lens.

8. The optical imaging system according to claim 1, wherein an object-side surface of the fifth lens is convex in a paraxial region, an image-side surface of the fifth lens is convex in a paraxial region; and
the optical imaging system further satisfies following conditions:

$$0.27 \le f5/f \le 1.11;$$

$$-0.63 \le (R9 + R10)/(R9 - R10) \le 0.30;$$

$$0.01 \le d9/TTL \le 0.04;$$

where
f5 denotes a focal length of the fifth lens;
d9 denotes an on-axis thickness of the fifth lens;
TTL denotes a total optical length of the optical imaging system;
R9 denotes a curvature radius of the object-side surface of the fifth lens; and
R10 denotes a curvature radius of a bonding surface of the fifth lens and the sixth lens.

9. The optical imaging system according to claim 1, wherein an object-side surface of the sixth lens is concave in a paraxial region, an image-side surface of the sixth lens is convex in a paraxial region; and
the optical imaging system further satisfies following conditions:

$$-3.09 \le f6/f \le -0.69;$$

$$-8.03 \le (R10 + R11/(R10 - R11) \le -0.71;$$

$$0.00 \le d11/TTL \le 0.02;$$

where
f6 denotes a focal length of the sixth lens;
d11 denotes an on-axis thickness of the sixth lens;
TTL denotes a total optical length of the optical imaging system;
R10 denotes a curvature radius of a bonding surface of the fifth lens and the sixth lens; and
R11 denotes a curvature radius of the image-side surface of the sixth lens.

10. The optical imaging system according to claim 1, wherein an object-side surface of the seventh lens is convex in a paraxial region; and the optical imaging system further satisfies following conditions:

$$0.23 \le f7/f \le 2.23;$$

$$-11.17 \le (R12 + R13)/(R12 - R13) \le 0.54;$$

$$0.00 \le d13/TTL \le 0.12,$$

where
f7 denotes a focal length of the seventh lens;
TTL denotes a total optical length of the optical imaging system;
R12 denotes a curvature radius of the object-side surface of the seventh lens; and
R13 denotes a curvature radius of a bonding surface of the seventh lens and the eighth lens.

11. The optical imaging system according to claim 1, wherein an image-side surface of the eighth lens is concave in a paraxial region; and
the optical imaging system further satisfies following conditions:

$$-1.15 \le f8/f \le -0.13;$$

$$0.28 \le (R13 + R14)/(R13 - R14) \le 3.15;$$

$$0.00 \le d15/TTL \le 0.07;$$

where
f8 denotes a focal length of the eighth lens;
TTL denotes a total optical length of the optical imaging system;
R13 denotes a curvature radius of a bonding surface of the seventh lens and the eighth lens; and
R14 denotes a curvature radius of the image-side surface of the eighth lens.

12. The optical imaging system according to claim 1, wherein the optical imaging system further satisfies following conditions:

$$-2.40 \le f9/f \le -0.31;$$

$$-2.84 \le (R15 + R16)/(R15 - R16) \le 1.63;$$

$$0.00 \le d17/TTL \le 0.05;$$

where
f9 denotes a focal length of the ninth lens;
TTL denotes a total optical length of the optical imaging system;
R15 denotes a curvature radius of an object-side surface of the ninth lens; and
R16 denotes a curvature radius of the image-side surface of the ninth lens.

13. The optical imaging system according to claim 1, wherein an image-side surface of the tenth lens is convex in a paraxial region; and
the optical imaging system further satisfies following conditions:

$$0.19 \le f10/f \le 1.11;$$

$$0.20 \le (R17 + R18)/(R17 - R18) \le 2.56;$$

$$0.01 \le d19/TTL \le 0.04;$$

where f10 denotes a focal length of the tenth lens;

d19 denotes an on-axis thickness of the tenth lens;

TTL denotes a total optical length of the optical imaging system;

R17 denotes a curvature radius of the object-side surface of the tenth lens; and R18 denotes a curvature radius of the image-side surface of the tenth lens.

14. The optical imaging system according to claim 1, wherein an object-side surface of the eleventh lens is concave in a paraxial region, an image-side surface of the eleventh lens is convex in a paraxial region; and the optical imaging system further satisfies following conditions:

$$-2.67 \le f11/f \le -0.37;$$

$$-8.92 \le (R19 + R20)/(R19 - R20) \le -0.76;$$

$$0.00 \le d21/TTL \le 0.01;$$

where f11 denotes a focal length of the eleventh lens;

d21 denotes an on-axis thickness of the eleventh lens;

TTL denotes a total optical length of the optical imaging system;

R19 denotes a curvature radius of the object-side surface of the eleventh lens; and R20 denotes a curvature radius of the image-side surface of the eleventh lens.

15. The optical imaging system according to claim 1, wherein an image-side surface of the twelfth lens is convex in a paraxial region; and the optical imaging system further satisfies following conditions:

$$0.26 \le f12/f \le 2.71;$$

$$0.31 \le (R21 + R22)/(R21 - R22) \le 3.92;$$

$$0.01 \le d23/TTL \le 0.03;$$

where f12 denotes a focal length of the twelfth lens;

d23 denotes an on-axis thickness of the twelfth lens;

TTL denotes a total optical length of the optical imaging system;

R21 denotes a curvature radius of the object-side surface of the twelfth lens; and R22 denotes a curvature radius of the image-side surface of the twelfth lens.

16. The optical imaging system according to claim 1, wherein the first lens, the second lens, the third lens, the fourth lens, the fifth lens, the sixth lens, the seventh lens, the eighth lens, the ninth lens, the tenth lens, the eleventh lens and the twelfth lens are all made of glass.

* * * * *